US010582105B2

(12) United States Patent
Naguib et al.

(10) Patent No.: US 10,582,105 B2
(45) Date of Patent: Mar. 3, 2020

(54) CHANGING CAMERA PARAMETERS BASED ON WIRELESS SIGNAL INFORMATION

(71) Applicant: QUALCOMM Incorporated, San Diego, CA (US)

(72) Inventors: Ayman Fawzy Naguib, Cupertino, CA (US); Hui Chao, San Jose, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/586,778

(22) Filed: Dec. 30, 2014

(65) Prior Publication Data
US 2016/0191775 A1 Jun. 30, 2016

(51) Int. Cl.
*H04N 5/232* (2006.01)
*H04N 1/00* (2006.01)
*G01S 5/02* (2010.01)

(52) U.S. Cl.
CPC ......... *H04N 5/232* (2013.01); *H04N 1/00244* (2013.01); *H04N 1/00315* (2013.01);
(Continued)

(58) Field of Classification Search
CPC ........................... H04N 7/17309; H04N 7/102
(Continued)

(56) References Cited

U.S. PATENT DOCUMENTS 5,844,505 A 12/1998 Van Ryzin
6,133,947 A 10/2000 Mikuni
(Continued)

FOREIGN PATENT DOCUMENTS

CN 100375070 C 3/2008
CN 102387466 A 3/2012
(Continued)

OTHER PUBLICATIONS

Assam A., "Sensor-Enhanced Imaging," University of Birmingham, Dec. 2012, 251 Pages.
(Continued)

*Primary Examiner* — Twyler L Haskins
*Assistant Examiner* — Fayez Bhuiyan
(74) *Attorney, Agent, or Firm* — Thien T. Nguyen

(57) ABSTRACT

Techniques describe opportunistically capturing and tagging images with wireless information by a mobile device. The tagged image may be transmitted to a remote server, such as a crowdsourcing server, where the location at which the image was captured may be determined using visual features from the image. An association between the location and the wireless measurements may be used in building/maintaining a heatmap. In one embodiment, techniques are described for setting camera parameters for opportunistically capturing images and may include receiving at least one signal associated with at least one signal emitting device, determining information associated with the at least one signal emitting device using the at least one signal, setting at least one camera parameter for a camera coupled to the mobile device based on the information associated with the at least one signal emitting device, and capturing one or more images using the at least one camera parameter.

30 Claims, 9 Drawing Sheets

(52) U.S. Cl.
CPC ..... *H04N 1/00912* (2013.01); *H04N 5/23216* (2013.01); *G01S 5/0252* (2013.01); *H04N 2201/0055* (2013.01); *H04N 2201/0074* (2013.01)

(58) Field of Classification Search
USPC .......................................................... 725/125
See application file for complete search history.

(56) References Cited

U.S. PATENT DOCUMENTS

| | | | |
|---|---|---|---|
| 6,970,189 | B1 | 11/2005 | Bernstein et al. |
| 8,386,422 | B1 | 2/2013 | Kadous et al. |
| 8,560,635 | B1 | 10/2013 | Sundaram et al. |
| 8,803,991 | B2 | 8/2014 | Konda |
| 8,818,706 | B1* | 8/2014 | Ogale ................. G01C 21/206 340/539.1 |
| 9,084,013 | B1 | 7/2015 | Arini et al. |
| 9,769,434 | B1 | 9/2017 | Smallwood et al. |
| 2003/0222796 | A1 | 12/2003 | Nagasaki |
| 2005/0037775 | A1 | 2/2005 | Moeglein et al. |
| 2007/0073937 | A1 | 3/2007 | Feinberg et al. |
| 2007/0127833 | A1 | 6/2007 | Singh |
| 2008/0068456 | A1 | 3/2008 | Fujii et al. |
| 2008/0151058 | A1 | 6/2008 | Xu et al. |
| 2008/0253808 | A1 | 10/2008 | Toyama et al. |
| 2008/0254808 | A1 | 10/2008 | Rekimoto |
| 2009/0023472 | A1 | 1/2009 | Yoo et al. |
| 2009/0051785 | A1 | 2/2009 | Kamada et al. |
| 2010/0225756 | A1 | 9/2010 | Miyata |
| 2010/0235091 | A1 | 9/2010 | Das et al. |
| 2010/0251101 | A1 | 9/2010 | Haussecker et al. |
| 2010/0268451 | A1 | 10/2010 | Choi |
| 2011/0046881 | A1 | 2/2011 | Karaoguz |
| 2011/0058802 | A1* | 3/2011 | Forutanpour .......... H04N 5/232 396/225 |
| 2011/0159921 | A1 | 6/2011 | Davis et al. |
| 2011/0267492 | A1 | 11/2011 | Prentice et al. |
| 2012/0046042 | A1 | 2/2012 | Son |
| 2012/0086825 | A1 | 4/2012 | Yost et al. |
| 2012/0236173 | A1 | 9/2012 | Telek et al. |
| 2012/0308081 | A1 | 12/2012 | Sato |
| 2013/0045751 | A1* | 2/2013 | Chao .................... G01C 21/206 455/456.1 |
| 2013/0101163 | A1 | 4/2013 | Gupta et al. |
| 2013/0116968 | A1 | 5/2013 | Wirola et al. |
| 2013/0121173 | A1 | 5/2013 | Chen et al. |
| 2013/0190018 | A1* | 7/2013 | Mathews ............... H04W 4/023 455/456.6 |
| 2013/0196681 | A1 | 8/2013 | Poduri et al. |
| 2013/0222369 | A1 | 8/2013 | Huston et al. |
| 2013/0230208 | A1 | 9/2013 | Gupta et al. |
| 2013/0235222 | A1 | 9/2013 | Karn et al. |
| 2013/0297321 | A1 | 11/2013 | Raux et al. |
| 2013/0322767 | A1 | 12/2013 | Chao et al. |
| 2013/0344886 | A1 | 12/2013 | Jarvis et al. |
| 2013/0346431 | A1 | 12/2013 | Erol et al. |
| 2014/0009612 | A1 | 1/2014 | King |
| 2014/0011518 | A1 | 1/2014 | Valaee et al. |
| 2014/0052401 | A1 | 2/2014 | Riley et al. |
| 2014/0136098 | A1 | 5/2014 | Stroila et al. |
| 2014/0153773 | A1 | 6/2014 | Gupta et al. |
| 2014/0171128 | A1 | 6/2014 | Bernhardt et al. |
| 2014/0179341 | A1 | 6/2014 | Sydir et al. |
| 2014/0218544 | A1* | 8/2014 | Senot .................... H04W 4/021 348/207.1 |
| 2014/0274114 | A1 | 9/2014 | Rowitch |
| 2014/0315570 | A1 | 10/2014 | Yun et al. |
| 2015/0045072 | A1 | 2/2015 | Chao et al. |
| 2015/0153191 | A1 | 6/2015 | Ma et al. |
| 2016/0188540 | A1 | 6/2016 | Naguib et al. |
| 2016/0189416 | A1 | 6/2016 | Naguib et al. |

FOREIGN PATENT DOCUMENTS

| | | |
|---|---|---|
| CN | 102960035 A | 3/2013 |
| WO | 2011032014 A1 | 3/2011 |
| WO | 2011144967 A1 | 11/2011 |

OTHER PUBLICATIONS

International Search Report and Written Opinion—PCT/US2015/067674—ISA/EPO—dated Mar. 30, 2016.

* cited by examiner

CHANGING CAMERA PARAMETERS BASED ON WIRELESS SIGNAL INFORMATION

TECHNICAL FIELD

The present disclosure generally relates to enabling location based services, and more specifically, machine-based visual data acquisition and processing for enabling location based services.

BACKGROUND

For mobile devices, there are countless applications that take advantage of a location fix of the mobile device for location based services. For example, a map application can select appropriate maps, direction, driving routes, etc., based on the current location of the mobile device. A social networking application can identify other users within the vicinity based on the location of the device. Many other examples exist. Different techniques for obtaining a position fix for a mobile device may be appropriate under different conditions. In an outdoor environment, satellite-based approaches, i.e., GNSS (Global Navigation Satellite System) techniques may be suitable, because the mobile device may be able to receive satellite-based positioning signals with specific timing requirements. Based on reception of such satellite signals, a position fix for the mobile device may be calculated. However, in some instances satellite-based approaches are not satisfactory for environments where the mobile device does not have a direct line of sight to a sufficient number of GNSS satellites. Such environments include indoor environments, urban canyons, etc.

Generally, techniques are described herein for improving location detection in such environments and other solutions.

SUMMARY

The present disclosure generally relates to enabling location based services, and more specifically, machine-based visual data acquisition and processing for enabling location based services.

Techniques describe tagging visual data (e.g., image and/or video data) with wireless (e.g., signal strength, round trip time, etc.) and sensor (barometer, accelerometer, gyroscope, etc.) measurement information by the mobile device. In some implementations, additional metadata fields may be used for tagging visual data with wireless and/or sensor measurement information. The mobile device may transmit the tagged visual data to a remote server, such as a crowdsourcing server. In some aspects, the tagged visual data may be used by the remote server, in determining the location at which the image was captured using visual features from the visual data and/or sensor measurements, and then associating the location with the wireless measurements for generating/maintaining heatmaps. As more and more devices send images with wireless measurements over a period of time, the crowdsourcing server continues to associate locations on the heatmap with wireless measurements and consequently refining and automatically updating the heatmap over time.

At a later point in time, the crowdsourcing server may make the heatmap available to various mobile devices. Updated and robust heatmaps from the crowdsourcing server enable the mobile devices to determine their location based on the wireless measurements acquired by the mobile device and matching the wireless measurements against the heatmap.

The above described process depends on the user capturing visual data with visual features that are identifiable at the crowdsourcing server. However, individual images from the users may have artifacts of illumination, motion blur, etc., resulting in poor quality images that are not useful for determining the location of the mobile device. Aspects of the disclosure describe collecting information from wireless signals, such as wireless measurements, and determining an interest in acquiring good wireless measurements associated with that location based on the wireless signal information. For example, based on the wireless information the mobile device may determine that the signal emitting devices, such as access points, support certain wireless protocols that may be used for positioning, and the signal emitting device associated with the wireless signals belong to a particular vendor and are stable signal emitting devices for performing positioning. If the mobile device (or the crowdsourcing server) determines that the wireless measurements associated with the location of the device are of interest, the mobile device may set its camera parameters to opportunistically capture images with camera parameter settings that are more likely to result in identification of visual features for determining the location of the mobile device.

Setting camera parameters may include switching to burst mode, where multiple images are acquired in quick subsequent shots, setting the zoom level, flash, ISO, exposure etc. Capturing the image with various camera parameters increases the probability of acquiring an image that may be useful in determining the location based on identifying features present in the image.

An example method for setting camera parameters may include receiving, at a mobile device, at least one signal associated with at least one signal emitting device, determining information associated with the at least one signal of the at least one signal emitting device using the at least one signal, and setting at least one camera parameter for a camera coupled to the mobile device for capturing image data based on the information associated with the at least one signal of the at least one signal emitting device. In one aspect, example method may further include capturing the image data using the at least one camera parameter, tagging the image data with the characteristics of the at least one signal associated with the at least one signal emitting device, and transmitting the tagged image data to a remote server. In one aspect, characteristics associated with the at least one signal of the at least one signal emitting device may be the signal strength associated with the at least one signal from the signal emitting device. In certain aspects information associated with the at least one signal may include characteristics of the at least one signal (e.g., signal strength) or information associated with the at least one signal emitting device (e.g., Media Access Control (MAC) address or vendor ID).

In some aspects of the example method, the at least one signal emitting device may be a wireless access point. In some aspects, setting the at least one camera parameter may include one or more of switching to a mode wherein the camera automatically captures a plurality of images in response to a request for acquiring image data, setting zoom, exposure, aperture, shutter speed, white balance, focus and/or flash. In some implementations, the example method includes changing the at least one camera parameter for each of the images of the plurality of images.

An example non-transitory computer-readable storage medium, wherein the non-transitory computer-readable storage medium comprises instructions executable by a processor, the instructions may include instructions to receive, at a mobile device, at least one signal associated with at least one signal emitting device, determine characteristics associated with the at least one signal from the at least one signal emitting device using the at least one signal, and set at least one camera parameter for a camera coupled to the mobile device for capturing image data based on the characteristics associated with the at least one signal from the at least one signal emitting device. In one aspect, example non-transitory computer-readable storage medium may further include capturing the image data using the at least one camera parameter, tagging the image data with the characteristics of the at least one signal associated with the at least one signal emitting device, and transmitting the tagged image data to a remote server. In one aspect, characteristics associated with the at least one signal of the at least one signal emitting device may be the signal strength associated with the at least one signal from the signal emitting device.

In some aspects of the example non-transitory computer-readable storage medium, the at least one signal emitting device may be a wireless access point. In some aspects, setting the at least one camera parameter may include one or more of switching to a mode wherein the camera automatically captures a plurality of images in response to a request for acquiring image data, setting zoom, exposure, aperture, shutter speed, white balance, focus and/or flash. In some implementations, the example method includes changing the at least one camera parameter for each of the images of the plurality of images.

An example apparatus for setting camera parameters may include the means for receiving, at the apparatus, at least one signal associated with at least one signal emitting device, means for determining characteristics associated with the at least one signal of the at least one signal emitting device using the at least one signal, and means for setting at least one camera parameter for a camera coupled to the mobile device for capturing image data based on the characteristics associated with the at least one signal of the at least one signal emitting device. In one aspect, example method may further include means for capturing the image data using the at least one camera parameter, means for tagging the image data with the characteristics of the at least one signal associated with the at least one signal emitting device, and means for transmitting the tagged image data to a remote server. In one aspect, characteristics associated with the at least one signal of the at least one signal emitting device may be the signal strength associated with the at least one signal from the signal emitting device.

In some aspects of the example apparatus, the at least one signal emitting device may be a wireless access point. In some aspects, setting the at least one camera parameter may include one or more of means for switching to a mode wherein the camera automatically captures a plurality of images in response to a request for acquiring image data, and/or means for setting zoom, exposure, aperture, shutter speed, white balance, focus and/or flash. In some implementations, the example apparatus includes changing the at least one camera parameter for each of the images of the plurality of images.

An example method for setting camera parameters may include receiving, at a mobile device, at least one signal associated with at least one signal emitting device, determining information associated with the at least one signal emitting device using the at least one signal, setting at least one camera parameter for a camera coupled to the mobile device based on the information associated with the at least one signal emitting device, and capturing a plurality of image using the at least one camera parameter. In one aspect, the example method may further include tagging an image from the plurality of images with the information associated with the at least one signal emitting device, and transmitting the tagged image to a remote server. In one aspect, the at least one signal emitting device is a wireless access point.

In some aspects of the example method, the at least one camera parameter is one or more of zoom, exposure, aperture, shutter speed, white balance, focus and/or flash. In some aspects of the example method, determining the at least one camera parameter is based on one or more of the policy for a geo fenced region associated with location of the mobile device, a number of signal emitting devices that the mobile device receives the signal from at a location, determining if the signal emitting device supports providing round trip time to the mobile device, determining the vendor of the signal emitting device, and/or determining if the signal emitting device is known to a remote server generating or maintaining a heatmap using information associated with the signal emitting device. In some instances, the information associated with the at least one signal associated with the at least one signal emitting device may not be the location of the device, itself.

An example non-transitory computer-readable storage medium, wherein the non-transitory computer-readable storage medium comprises instructions executable by a processor for receiving, at a mobile device, at least one signal associated with at least one signal emitting device, determining information associated with the at least one signal emitting device using the at least one signal, setting at least one camera parameter for a camera coupled to the mobile device based on the information associated with the at least one signal emitting device, and capturing a plurality of image using the at least one camera parameter. In one aspect, the example non-transitory computer-readable storage medium may further include tagging an image from the plurality of images with the information associated with the at least one signal emitting device, and transmitting the tagged image to a remote server. In one aspect, the at least one signal emitting device is a wireless access point.

In some aspects of the example non-transitory computer-readable storage medium, the at least one camera parameter is one or more of zoom, exposure, aperture, shutter speed, white balance, focus and/or flash. In some aspects of the example non-transitory computer-readable storage medium, determining the at least one camera parameter is based on one or more of the policy for a geo fenced region associated with location of the mobile device, a number of signal emitting devices that the mobile device receives the signal from at a location, determining if the signal emitting device supports providing round trip time to the mobile device, determining the vendor of the signal emitting device, and/or determining if the signal emitting device is known to a remote server generating or maintaining a heatmap using information associated with the signal emitting device. In some instances, the information associated with the at least one signal associated with the at least one signal emitting device may not be the location of the device, itself.

An example apparatus for setting camera parameters may include means for receiving, at a mobile device, at least one signal associated with at least one signal emitting device, means for determining information associated with the at least one signal emitting device using the at least one signal, means for setting at least one camera parameter for a camera coupled to the mobile device based on the information associated with the at least one signal emitting device, and means for capturing a plurality of image using the at least one camera parameter. In one aspect, the example non-transitory computer-readable storage medium may further include means for tagging an image from the plurality of images with the information associated with the at least one signal emitting device, and means for transmitting the tagged image to a remote server. In one aspect, the at least one signal emitting device is a wireless access point.

In some aspects of the example apparatus, the at least one camera parameter is one or more of zoom, exposure, aperture, shutter speed, white balance, focus and/or flash. In some aspects of the example apparatus, determining the at least one camera parameter is based on one or more of the policy for a geo fenced region associated with location of the mobile device, a number of signal emitting devices that the mobile device receives the signal from at a location, means for determining if the signal emitting device supports providing round trip time to the mobile device, means for determining the vendor of the signal emitting device, and/or means for determining if the signal emitting device is known to a remote server generating or maintaining a heatmap using information associated with the signal emitting device. In some instances, the information associated with the at least one signal associated with the at least one signal emitting device may not be the location of the device, itself.

The foregoing has outlined rather broadly features and technical advantages of examples in order that the detailed description that follows can be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
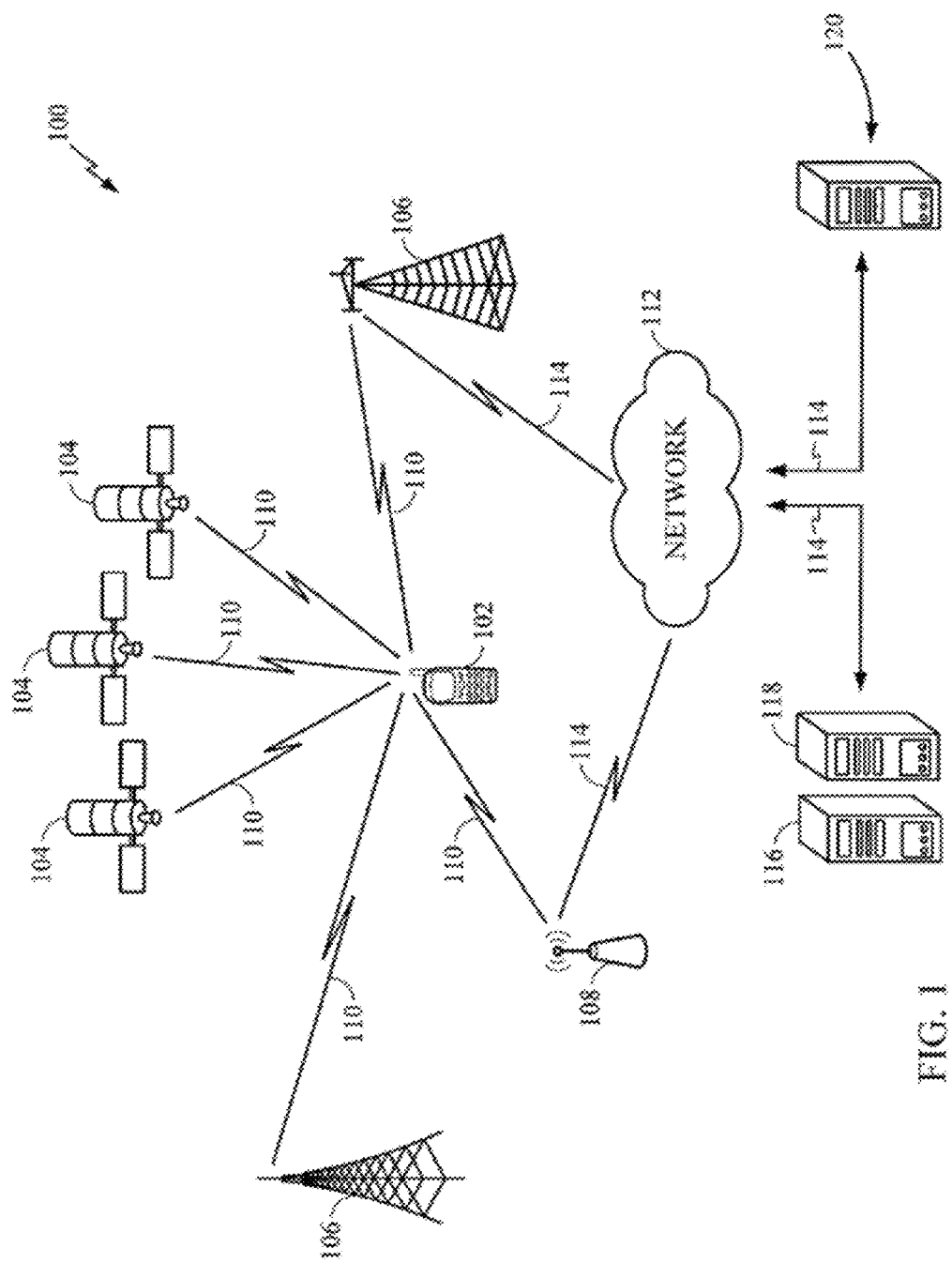
FIG. 1 is a schematic diagram illustrating features associated with an implementation of an example operating environment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

For mobile devices, there are countless applications that take advantage of the location fix of the device for location based services. For example, a map application can select appropriate maps, direction, driving routes, etc., based on the current location of the mobile device. A social networking application can identify other users within the vicinity based on the location of the device. Many other examples exist. Different techniques for obtaining a position fix for a mobile device may be appropriate under different conditions. In an outdoor environment, satellite-based approaches, i.e., GNSS (Global Navigation Satellite System) techniques may be suitable because the mobile device may be able to receive satellite-based positioning signals with specific timing requirements. Based on reception of such satellite signals, a position fix for the mobile device may be calculated. However, in some instances satellite-based approaches are not satisfactory for environments where the mobile device does not have a direct line of sight to sufficient number of GNSS satellites. Such environments may be referred to as GNSS-denied environments and may include indoor environments (e.g., shopping mall, airport, sports arena, etc.) and outdoor environments (urban canyons, etc.).

In such GNSS-denied environments where the mobile device does not have a direct line of sight to sufficient number of satellites, access point (AP)-based approaches are generally more useful for obtaining a location fix for a mobile device. The mobile device observes signals sent to and/or from APs at known locations. Different types of measurements may be obtained, such as RSSI (Received Signal Strength Indication) and RTT (Round-trip Time) at the mobile device. The mobile device may compare these measurements against a map that associates wireless measurements with locations (also referred to as heatmaps) to determine the location of the device. In one example, the mobile device may download the heatmap from a remote server (i.e., heatmap server) for the specific location the mobile device is at.

However, generating heatmaps for innumerable locations with unsatisfactory satellite coverage and keeping those maps updated is a challenging task. For example, generating the heatmap may require that a technician manually visits each indoor location and creates a mapping between the wireless measurements at the location and the location itself. Furthermore, as the APs are removed, added or moved, the wireless measurements at each location may change, outdating the information associated with the heatmaps. Periodically, updating the heatmap may require that the technician revisit the indoor location and recreate the association between the wireless measurements and locations.

Embodiments of the disclosure generally describe setting at least one camera parameter for a camera coupled to a mobile device for capturing image data based on characteristics associated with the at least one signal received by the mobile device. The image data may include visual data. Visual data may refer to images and/or videos that include visual features. Visual features may refer to one or more visual elements capable of being identified or recognized based, at least in part, on their relatively uniform representation or consistency of use, in commerce or otherwise, for example, logos, landmarks, distinctive designs or architectural features. Image data that is captured can be tagged with wireless and sensor measurement information by the mobile device. In some implementations, additional metadata fields may be used for tagging visual data with wireless and/or sensor measurement information. Generally, metadata describes the attributes associated with the image. For example, the metadata for an Exchangeable image file format (Exif) may include format of the file, the device used to capture the image, date and time, and the at least one camera parameter, for example, resolution of the image, exposure, focal length, flash, etc.

In certain embodiments, the camera parameters may be set based on information associated with the at least one signal and information associated with the at least one signal may include characteristics of the at least one signal (e.g., signal strength) or information associated with the at least one signal emitting device (e.g., Media Access Control (MAC) address or vendor ID).

Embodiments also describe expanding the current format dictated by the standards for image (e.g., Exif) and video formats (mediaObject metadata) to include wireless and sensor measurements in the metadata. Examples of wireless information may include, but is not limited to, wireless wide area network (WWAN) measurements and Wi-Fi measurements. Wi-Fi measurements may include RSSI and RTT measurements. Sensor information may include barometer, magnetometer and sensor (e.g., accelerometer, gyroscope, light sensor, barometer, etc.) information. The mobile device may transmit the tagged visual data to a crowdsourcing server.

Embodiments of the disclosure are generally described referring to images, however, any type of visual data, such as videos may be used instead of images in embodiments of the disclosure without departing from the scope of the disclosure.

The crowdsourcing server receives the tagged image from the mobile device and identifies one or more visual features (e.g., storefront logo) from the image and determines the location at which the image was captured based on the identified feature. That is, the crowdsourcing server performs image-based location estimation. For example, the crowdsourcing server may identify the storefront logo (e.g., JCrew) for a store from the image. The crowdsourcing server may also estimate the angle at which the image was captured and the distance of the mobile device from the logo, based on the orientation of the logo in the image, the shape of the logo in the image and the size of the logo. In this manner, the crowdsourcing server determines the location at which the image was captured based on the visible features in the image.

Now that the crowdsourcing server has determined the approximate location at which the image was captured, the crowdsourcing server extracts the wireless (e.g., Wi-Fi) measurements from the image metadata and associates those wireless measurements with the location on the heatmap. As more and more devices send images with wireless measurements over a period of time, the crowdsourcing server continues to associate locations on the heatmap with wireless measurements and consequently refining and automatically updating the heatmap over time.

At a later point in time, the crowdsourcing server may make the heatmap available to various mobile devices. Updated and robust heatmaps from the crowdsourcing server enable the mobile devices to determine their location based on the wireless measurements acquired by the mobile device and matching the wireless measurements against the heatmap.

Information associated with other sensors tagged to the image may also be helpful in location determination by the remote server. For example, in a multi-level building, barometer readings may help determine the level of the building at which the mobile device captured the image.

The above described process depends on the user capturing image with visual features that are identifiable at the crowdsourcing server. However, individual images from the users may have artifacts of illumination, motion blur, etc., resulting in poor quality images that are not useful for determining the location of the mobile device. Furthermore, the camera settings for the camera may not be optimal for capturing the visual features that may be used by the crowdsourcing server in determining the location at which the image was taken. For example, a user of the camera taking pictures of friends in a shopping mall may focus the lens on the friends and not the storefront logo in the background. Similarly, other camera parameter settings, such as zoom, exposure may be set such that the visual features of interest may be obscured because of the selected camera setting. Moreover, the process of collecting data from user images is an opportunistic and slow process. Embodiments of the disclosure expedite and enhance the process of building out and updating a heatmap.

Embodiments of the disclosure describe collecting information from wireless signals, such as wireless measurements, and determining an interest in acquiring good wireless measurements associated with that location based on the wireless signal information. For example, based on the wireless information the mobile device may determine that the access points support RTT or RSSI protocols that may be used for positioning, and the access points associated with the wireless signals belong to a particular vendor and are stable access points for performing positioning. If the mobile device (or the crowdsourcing server) determines that the wireless measurements associated with the location of the device are of interest, the mobile device may set its camera parameters to opportunistically capture images that with setting that are more likely to result in identification of visual features for determining the location of the mobile device.

Setting camera parameters may include switching to burst mode, where multiple images are acquired in quick subsequent shots, setting the zoom level, flash, ISO, exposure etc.

Capturing the image with various camera parameters increases the probability of acquiring an image that may be useful in determining the location based on identifying features present in the image.

FIG. 1 is a schematic diagram illustrating features associated with an implementation of an example operating environment 100 capable of facilitating or supporting one or more processes or operations for position estimation of a mobile device 102. It should be appreciated that operating environment 100 is described herein as a non-limiting example that may be implemented, in whole or in part, in the context of various communications networks or combination of networks, such as public networks (e.g., the Internet, the World Wide Web), private networks (e. g., intranets), wireless local area networks (WLAN, etc.), or the like.

It should also be noted that although the subject matter is described providing examples related to indoor implementations, embodiments of the disclosure are not limited to indoor implementations. In some example scenarios, embodiments of the disclosure may be operable in a GNSS-denied (or United States Global Positioning System (GPS)-denied) environment. A GNSS-denied environment may refer to any environment where using GNSS satellites for obtaining a position fix for a mobile device may not be possible or may be unsatisfactory. Such GNSS-denied environments may include indoor environments, such as a shopping mall, airport, sports arena, etc., but also outdoor locations, such as urban canyons, town squares, amphitheaters, parking garages, rooftop gardens, patios, etc., where it is difficult for a mobile device to have a line of sight with sufficient GNSS satellites to obtain a position fix.

As illustrated, operating environment 100 may comprise, for example, one or more satellites 104, base transceiver stations 106, wireless signal emitting devices 108 (only one wireless signal emitting device 108 illustrated in FIG. 1 for ease of illustration, but it is understood that the operating environment 100 may include multiple signal emitting devices 108 and will generally include at least one wireless signal emitting device 108), etc., capable of communicating with mobile device 102 via wireless communication links 110 in accordance with one or more communication protocols. Satellites 104 may be associated with one or more GNSS satellite positioning systems (SPS), such as, for example, the United States Global Positioning System (GPS), the Russian GLONASS system, the European Galileo system, as well as any system that may utilize satellites from a combination of satellite systems, or any satellite system developed in the future. Although, in describing some embodiments, for simplicity and illustration purposes a GPS or GNSS-denied environment is discussed, other satellite positioning systems may be substituted without departing from the scope of the disclosure. Base transceiver stations 106, wireless signal emitting devices 108, etc., may be of the same or similar type, for example, or may represent different types of devices, such as access points, radio beacons, cellular base stations, femtocells, or the like, depending on an implementation. At times, one or more signal emitting devices 108, for example, may be capable of transmitting as well as receiving wireless signals. In some instantiations, wireless signal emitting devices 108, may also include devices configurable to emit signals such as Wi-Fi signal, audible and non-audible sound, and (visible and non-visible) light rays.

In some instances, one or more base transceiver stations 106, signal emitting devices 108, etc., may, for example, be operatively coupled to a network 112 that may comprise one or more wired or wireless communications or computing networks capable of providing suitable or desired information, such as via one or more communication links 114. As will be seen, information may include, for example, assistance information associating relevant places of interests (POIs) with known locations within an indoor or like area of interest and brand specific visual signatures attributed to these POIs, just to illustrate one possible implementation. At times, assistance information may include, for example, identities or locations of one or more base transceiver stations 106, wireless signal emitting devices 108, or the like to facilitate or support one or more operations or processes associated with operating environment 100. As a way of illustration, assistance information may, for example, be provided in the form of a digital map, look-up table, mathematical formula, suitable model, algorithm, etc., which may depend, at least in part, on an application, network, environment, or the like. In an implementation, network 112 may be capable of facilitating or supporting communications between suitable computing platforms or devices, such as, for example, mobile device 102, one or more base transceiver stations 106, wireless signal emitting devices 108, as well as one or more servers associated with operating environment 100.

In some instances, servers may include, for example, a crowdsourcing server 116, a heatmap distribution server 118, as well as one or more other servers, indicated generally as 120 (e.g., navigation, information, map, server, etc.), capable of facilitating or supporting one or more operations or processes associated with operating environment 100.

In some scenarios, the heatmap distribution server 118 may distribute heatmaps to mobile devices 102 operating in the operating environment 100. In some instances, the heatmaps are automatically distributed to mobile devices entering a region supported by the heatmap distribution server 118. In other embodiments, the mobile device 102 requests and downloads the applicable heatmap for the region that the mobile device is either operating in or will be operating in. In one example scenario, the mobile device 102 may use a heatmap to determine its location in an operating environment 100. In one example implementation, the mobile device 102 observes signals sent to and/or from signal emitting devices (such as access points) at known locations. Different types of measurements may be obtained, such as RSSI and RTT at the mobile device. The mobile device may compare these measurements against a heatmap that associates wireless measurements with locations to determine the location of the device.

Embodiments of the disclosure also describe techniques for gathering information using crowdsourcing for generating, updating and maintaining heatmaps using a crowdsourcing server 116. The crowdsourcing server 116 may be used for collecting information from a plurality of mobile devices and updating a heatmap.

Figure 2:
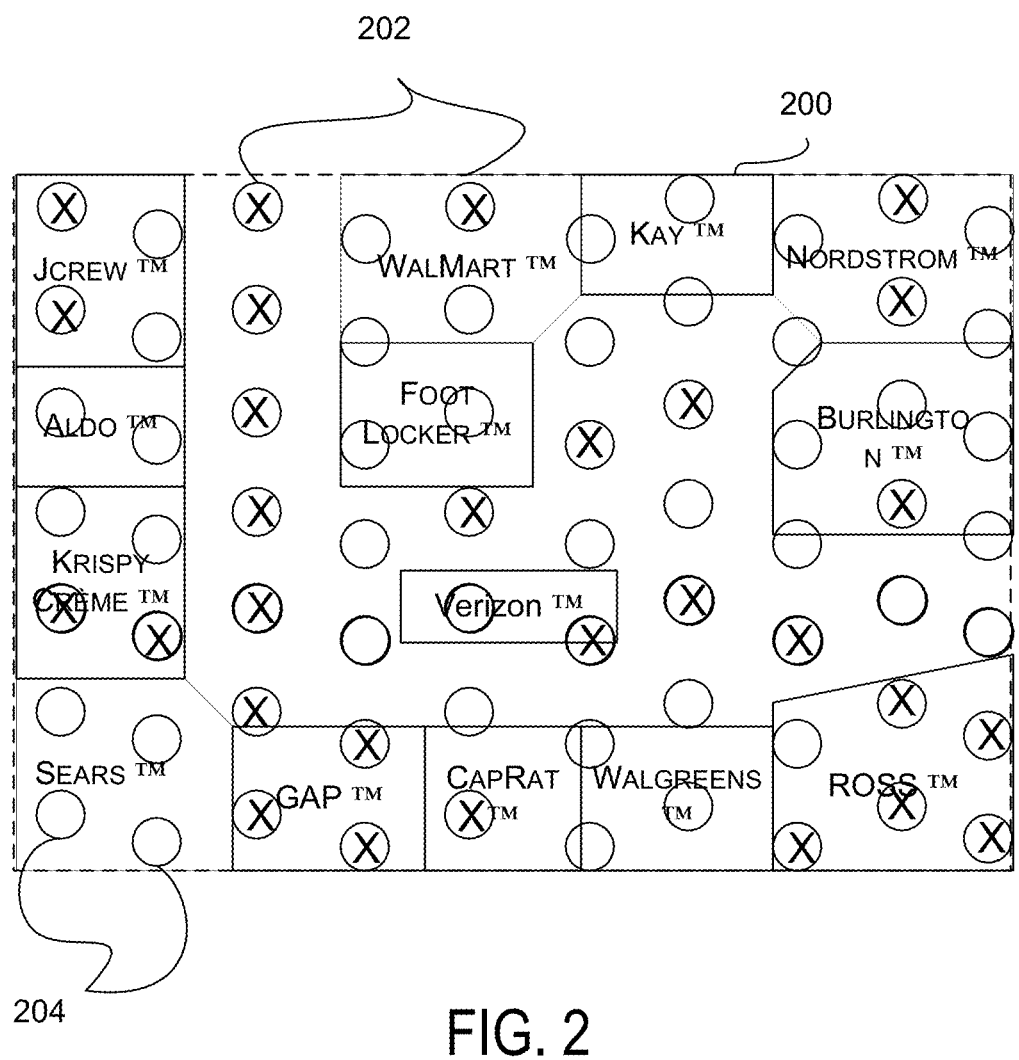
FIG. 2 illustrates a simplified example visual representation of a heatmap for a shopping mall.

FIG. 2 illustrates a simplified example of a visual representation of a heatmap for a shopping mall. A heatmap may be generated, maintained and updated by a crowdsourcing server 116 and distributed to the mobile device 102 by the heatmap distribution server 118. The heatmap 200 may enable a mobile device in determining its location in a GNSS-denied environment using wireless signal information from neighboring signal emitting devices. In one implementation, the heatmap 200, as shown in FIG. 2, may associate location information, such as coordinates on a map, with wireless measurement information, such as RSSI and RTT information associated with signal emitting devices 108, such as APs. In FIG. 2, the oval circles (i.e., 202, 204 may each represent location coordinates associated with the heatmap 200. For each location coordinate, information associated with that location coordinate may include the location and source identifying information associated with the one or more signal emitting devices 108. In addition, in some implementations, the information associated with the location may also include measurements associated with the signal from the signal emitting device 108. An example implementation of the information associated with each location coordinate or node on a heatmap 200 is further described in FIG. 3. In one implementation, the oval circles marked with 'X' mark (204) represent locations with actual measurements from one or more mobile devices that collected information from those respective locations in the past, whereas the oval circles without the 'X' mark (202) may represent data interpolated from neighboring locations. In some instances, with the number of actual measurements, the overall accuracy of the heatmap increases.

The crowdsourcing server 116 may generate, update and maintain such heatmaps for several GNSS-denied environments. At a different point in time, the crowdsourcing server 116 may make the heatmap 200 available to various mobile devices. Either automatically, or upon request from the mobile device 102, the heatmap distribution server 118 may distribute the heatmap to the mobile device 102. In some instances, the heatmap may be distributed to the mobile device in advance of the mobile device's visit to the GNSS-denied environment, or if the mobile device 102 frequently visits the GNSS-denied environment. Updated and robust heatmaps from the crowdsourcing server 116 and heatmap distribution server 118 are made available to mobile device 102 and enable the mobile devices to determine their location, especially in a GNSS-denied environment.

Figure 3:
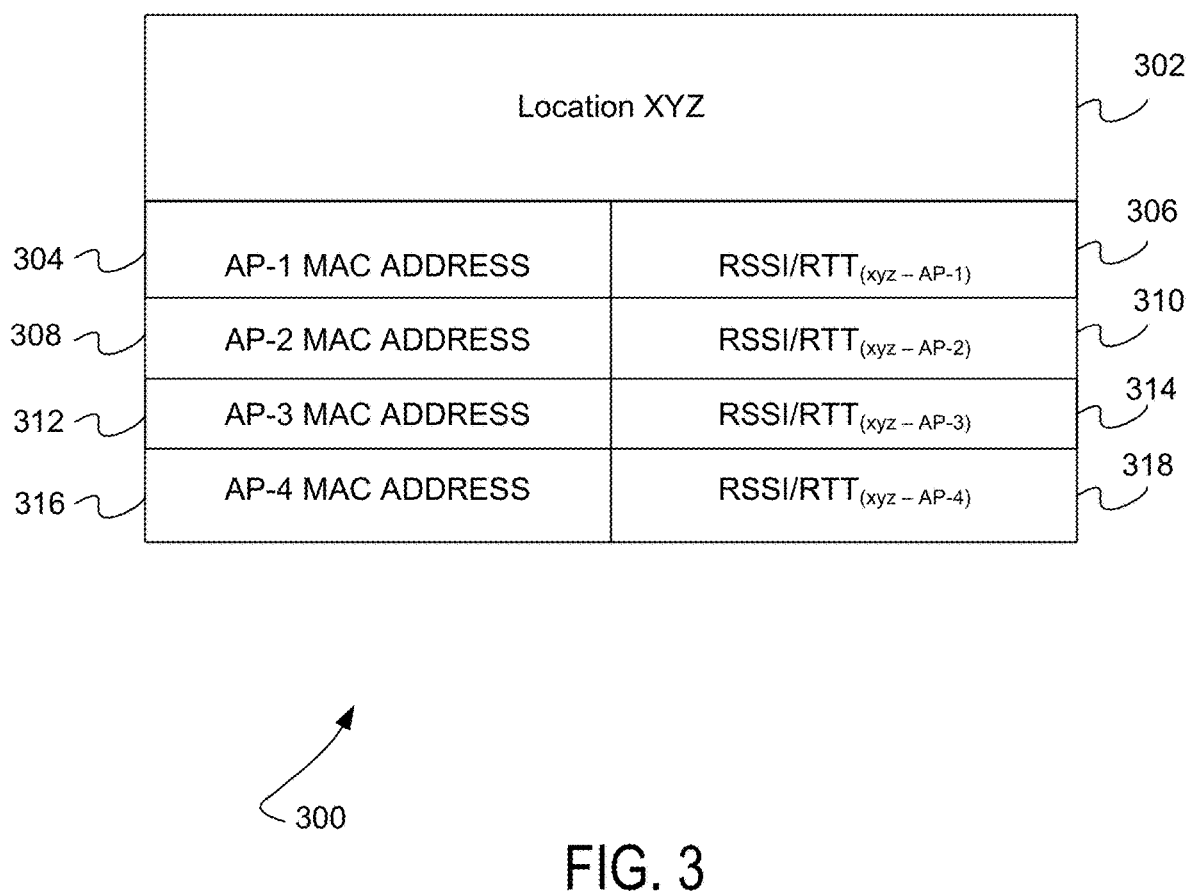
FIG. 3 illustrates an example data structure for associating a location with wireless information for a location on a heatmap.

FIG. 3 illustrates an example data structure for associating a location with example wireless information measured at or interpolated for a location. In one example, each node depicted as an oval circle in the heatmap of FIG. 2 may comprise a similar data structure 300 that associates the location with AP information. As shown in FIG. 3, at a given location XYZ 302, the heatmap 200 may have information associated with four different signal APs. The information associated with the four different APs may include RSSI and/or RTT information measured by one or more representative mobile devices at location XYZ 302 for each of the four APs. In alternative implementations, or in addition to RSSI and/or RTT measurements, the data structure 300 may include any information that is measurable and changes proportionally to the distance between the AP and a representative mobile device located at location XYZ 302.

In FIG. 3, the data structure 300 has four entries for four APs representing the measurement performed or interpolated for location XYZ 302. Each entry may have a source identifying field and a measurement field. For example, for AP-1, the first entry has the AP-1 media access control (MAC) address 304 and the RSSI and/or the RTT information for AP-1 for a representative device measuring the RSSI/RTT at location XYZ 302 (block 306). Similarly for AP-2, AP-3 and AP-4, the second, third and fourth entries have their respective MAC addresses (308, 312 and 316) and respective RSSI/RTT measurements for the respective APs (310, 314 and 318) when measured from a representative mobile device at location XYZ 302.

In FIG. 3, the MAC address serves as a unique source identifier for each of the APs. Any other source identifier that sufficiently distinguishes several APs (or other signal emitting devices) from each other may be used without departing from embodiments of the disclosure. For example, in some embodiments, an internet protocol (IP) address may be used in a configuration where the IP addresses are statically assigned to devices.

FIG. 3 depicts information at a location coordinate or node represented in a heatmap depicted in FIG. 2 using four entries. Embodiments of the disclosure are not limited to four entries and may have more or less entries. In some instances, the number of entries for the data structure may be based on the number of APs available, the capabilities of the APs and the implementation restrictions on the size of the data structure. Furthermore, in some embodiments, instead of, or in addition to, storing the source identifying information for several signal identifying entities and the measurements for their associated signals (e.g., RSSI/RTT), some or all of the data may be hashed to generate a unique fingerprint for the location, representing a snapshot view of the various signal characteristics observed at the location.

As described herein, for illustration purposes, embodiments of the disclosure are discussed referring to a wireless AP. However, any wireless signal emitting device 108 may be used without departing from embodiments of the disclosure. For example, in some embodiments, a wireless signal emitting device 108 may include devices such as light (visible and non-visible) emitting devices and sound (audible and non-audible) emitting devices. For example, a light emitting device may include a fluorescent light bulb. The fluorescent light bulb may emit information with sufficient uniqueness that can generally identify and differentiate the fluorescent light bulb from other fluorescent light bulbs in the environment. For example, the flicker of the light emitting from various light bulbs may be sufficiently distinct for each light bulb due to the manufacturing process to generally differentiate one fluorescent light bulb from another. In another embodiment, the fluorescent light bulb may be manufactured to emit a flicker with encoded information identifying the fluorescent light bulb. The flicker may not be noticeable to the human eye, but the mobile device 102 may be programmed to observe such a flicker. Furthermore, the proportionality of the measurement with respect to the distance between the light bulb and the mobile device can be measured using the amplitude of the light rays (i.e., brightness, illumination, etc.) received at the mobile device or any other suitable means.

In most instances, but not all, the signal emitting device may be stationary with respect to a location coordinate on the map thus providing information that is consistent over a period of time and may be used to generate a signature for the location.

In one implementation, the heatmap may not be limited to a particular type of signal emitting device or technique for measuring of the signal characteristics between the mobile device and the signal emitting devices. For example, for a heatmap for a GNSS-denied environment, the heatmap may include information associated with a combination of signal emitting devices 108 such as APs, radio beacons, cellular base stations, femtocells, fluorescent light bulbs, light (visible and non-visible) emitting devices and sound (audible and non-audible) emitting devices. Furthermore, even for APs, the signal characteristics may be measured using a combination of techniques such as RTT and RSSI. In some instances, the capabilities of the APs may determine the measurement technique used. For heatmaps that include a larger variance of signal emitting devices, such as APs, ultra-sound devices, light bulbs, the measuring techniques with respect to a the signal emitting devices may show an even greater variance, such as including RTT, RSSI, light flicker, etc.

The above figures (FIG. 2 and FIG. 3) describe a heatmap and the associated information stored at location coordinates for the heatmap. However, generating heatmaps for innumerable GNSS-denied locations and keeping those maps updated is a challenging task. For example, generating the heatmap may require that a technician manually visits each indoor location and creates a mapping between the wireless measurements at the location and the location itself. Furthermore, as the APs are removed, added or moved, the wireless measurements at each location may change, outdating the information associated with the heatmaps. Periodically updating the heatmap may require that the technician revisit the GNSS-denied location and recreate the association between the wireless measurements and locations.

Embodiments of the disclosure may use data collected from several mobile devices at a crowdsourcing server 116 to generate and periodically update the heatmaps. As discussed in further detail below, at the mobile device, embodiments of the disclosure generally describe tagging visual data (e.g., image and/or video data) with wireless and sensor measurement information. In some implementations, additional metadata fields may be used for tagging visual data with wireless and/or sensor measurement information. The tagged information may be sent to a server, such as a crowdsourcing server 116, where the crowdsourcing server 116 may derive the location the image was captured at using visual features from the visual data and optionally sensor information included in the file. The crowdsourcing server 116 may extract the information associated with the wireless signal emitting device and associate the location coordinate on a heatmap with the information associated with the wireless signal emitting device.

Figure 4:
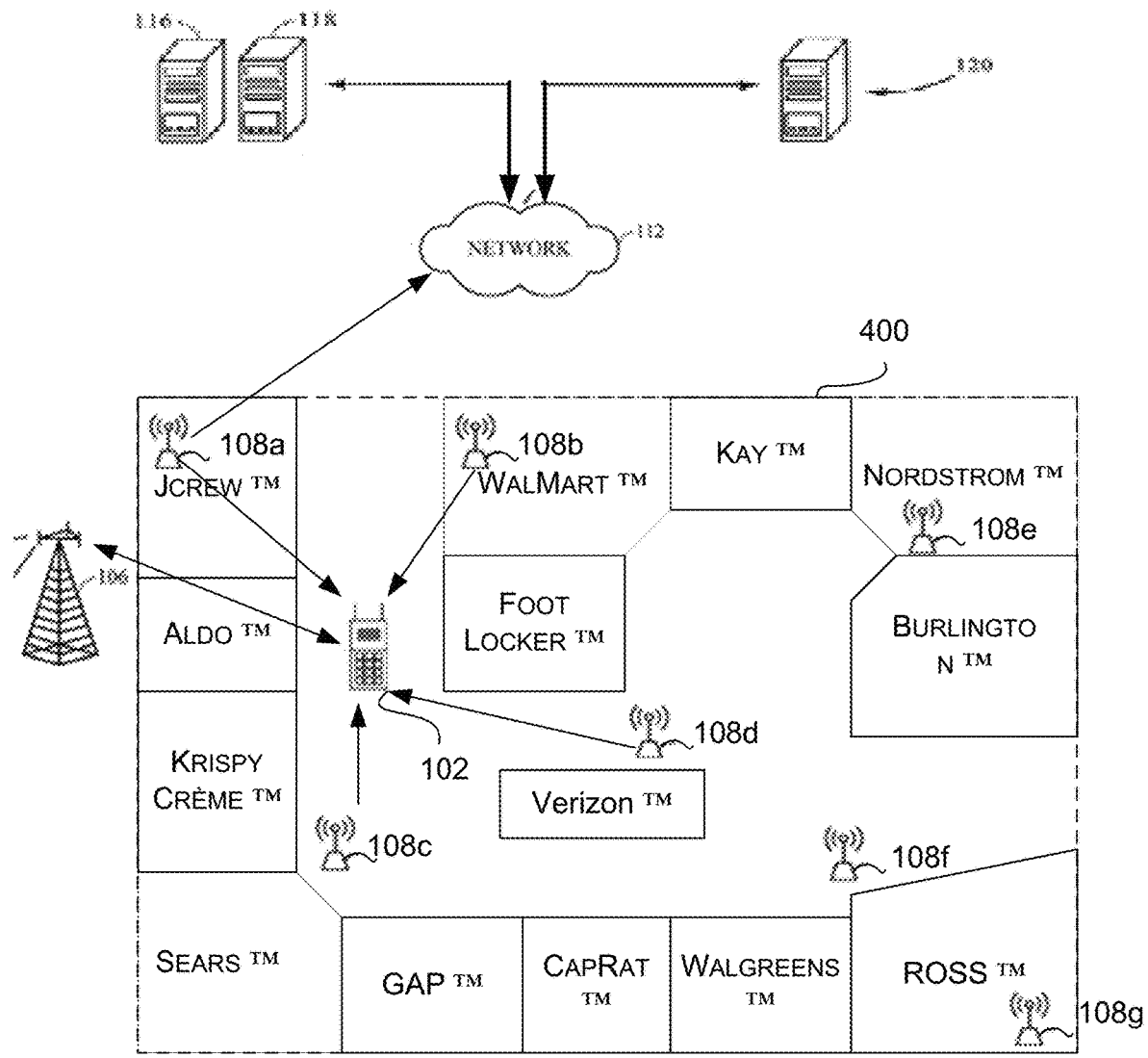
FIG. 4 illustrates an example mobile device configurable to opportunistically capture visual data and information associated with wireless signal emitting devices and/or sensors.

FIG. 4 illustrates an example mobile device configurable according to embodiments of the disclosure for capturing visual data, such as images and/or videos and tagging the image with information associated with wireless signal emitting devices and/or sensors. As shown in FIG. 4, at a given point in time, the user of the mobile device 102 is at a shopping mall 400 with the mobile device 102. The shopping mall 400 may represent a GNSS-denied environment and may be similar to the operating environment 100 discussed in FIG. 1 in some respects. In FIG. 4, in one embodiment, the mobile device 102 may facilitate the crowdsourcing function by collecting data regarding the signal emitting devices 108 and transmitting that data to a crowdsourcing server 116 for generating, updating and maintaining a heatmap. In one implementation, the mobile device 102 may be pre-registered to collect data on behalf of the crowdsourcing server 116.

As shown in FIG. 4, the operating environment for the shopping mall 400 has several branded stores and depicts eight distinct signal emitting devices 108a-g, such as APs, spread throughout the shopping mall. The user of the mobile device 102 may take a picture or a video while inside the shopping mall, with the purpose of gathering information for a crowdsourcing server 116, or casually, as a normal course of action, for example, while visiting the shopping mall with friends and taking pictures together. The picture may inadvertently capture visual features from the scene, such as prominent store logos, landmarks, statues, distinct architectural features or distinct designs. Such visual features may be later used by the crowdsourcing server 116 for determining the location at which the visual data (image and/or video) was captured.

Embodiments of the disclosure are generally described referring to images, however, any type of visual data, such as videos may be used instead of images in embodiments of the disclosure without departing from the scope of the disclosure.

The above described process depends on the user capturing images with visual features that are identifiable at the crowdsourcing server 116. However, individual images from the users may have artifacts of illumination, motion blur, etc., resulting in poor quality images that are not useful for determining the location of the mobile device. Furthermore, the camera settings for the camera may not be optimal for capturing the visual features that may be used by the crowdsourcing server in determining the location at which the image was taken. For example, a user of the camera taking pictures of friends in a shopping mall may focus the lens on the friends and not the storefront logo in the background that may be desirable for location detection.

Similarly, other camera parameter settings, such as zoom, exposure, aperture, shutter speed, white balance, focus and flash may be set such that the visual features of interest for detecting the location at which the image was captured may be obscured or at least not readily detectable because of the selected camera settings. Furthermore, the process of collecting data from user images is an opportunistic and slow process. Embodiments of the disclosure expedite and enhance the process of building out and updating a heatmap.

Embodiments of the disclosure describe collecting information from wireless signals, such as wireless measurements, and determining an interest in acquiring good wireless measurements associated with that location based on the wireless signal information. For example, an interest for acquiring good pictures at a location may be based on the capabilities of the signal emitting device (e.g, support for RTT) in the vicinity, the number of signal emitting devices in the vicinity, a policy for a geo fenced region associated with location of the mobile device, determining the characteristics of the signal (e.g., signal strength or RSSI), determining the vendor of the signal emitting device and/or determining if the signal emitting device is known to a remote server generating or maintaining a heatmap using information associated with the signal emitting device.

In most instances described above, the mobile device may make the determination of an interest of capturing images more suitable for location detection by examining the wireless signals and/or deriving more information regarding the one or more signal emitting devices. For example, multiple signals from multiple signal emitting devices 108 detected by the mobile device 102, indicates to the mobile device 102 that the location the mobile device 102 is currently may be interesting to a crowdsourcing server for developing the heatmap that uses wireless signals. In one implementation, the mobile device 102 may determine that the signals are from multiple devices by deriving the MAC address or IP address from the data packages embedded in each of the signals.

Similarly, the presence of signal emitting devices with strong signal (measured by RSSI) or the closeness of the signal emitting devices to the mobile device 102 (measured by RSSI or RTT) may increase the interest in acquiring images more suitable for location detection at that location.

Furthermore, in some instances, a location may be more interesting for positioning to a crowdsourcing server 116, if at that location one or more signal emitting devices support protocols that enable positioning. For example, signal emitting devices that support RTT capability may be more desirable than signal emitting devices that do not support RTT. Supporting RTT by a signal emitting device 108 may include receiving a RTT request at a signal emitting device, processing the request, and responding back to the mobile device 102 according to a predetermined protocol, so that the mobile device 102 can determine the approximate round trip time for a signal from the mobile device 102 to the signal emitting device 108 and for the same or a different signal from the signal emitting device 108 to the mobile device 102. In some instances, the RTT may also indicate the relative distance of the signal emitting device 108 from the mobile device 102, based on the constant speed of light through space.

In some instances, the mobile device 102 may determine the vendor, manufacturer, the make/model, the firmware/software update number for the signal emitting device 108 that the mobile device 102 receives the signal from at a location. The mobile device 102 may be able to assess the general stability, operational capability, support, protocol adherence and other such characteristics associated with the signal emitting device 108, by using such identifying information regarding the signal emitting device 108. In determining the interest associated with a location, the mobile device 102 may take into consideration such characteristics, such as the general stability, operational capability, support, protocol adherence, etc. of the signal emitting devices 108 that the mobile device 102 may receive signals from in determining the interest associated with capturing images that are more suitable for location determination.

In some instances, a location may be interesting for positioning if the location belongs to a general region of interest to the crowdsourcing server 116. For example, if the last known good location for a mobile device 102 is near a shopping mall that in itself may be a good indication that the user with the mobile device 102 is inside the shopping mall in a GNSS-denied environment. In such a scenario, the mobile device 102 may determine (after possible communication with the crowdsourcing server 116) that wireless information associated with the shopping mall is of interest to the crowdsourcing server 116. Such a determination may be based one or more considerations. For example, the crowdsourcing server 116, may not have a heatmap for the shopping mall that the user is currently at and is generally interested in gathering as much wireless signal information associated with locations at the shopping mall as fast as possible or that the crowdsourcing server 116 needs to update all the information it may have for the shopping mall due to changes at the shopping mall, such as a reconstruction project. It should be noted, in such a scenario as described above, the interest is not based on the exact location of the mobile device 102, but the general region that the mobile device 102 may be operating in.

Although, the examples above describe a mobile device 102 determining an interest in the wireless signals at a location, the determination of the interest associated with the location may be by a remote server, such as the crowdsourcing server 116 or a combination of information sharing and decision making by both the mobile device 102 and the remote server. Furthermore, in some instances the mobile device 102 may autonomously determine the interest associated with a location, whereas in other instances, the mobile device 102 may communicate with the remote server for either determining the interest or providing additional information for determining the interest for a location. In yet other embodiments, the mobile device 102 may be provided guidelines, rules or protocols for determining interest associated with a location, that may be pre-configured and/or periodically updatable by a remote server.

Once the mobile device 102 determines that a particular location is of interest for capturing images that may be suitable for location determination, the mobile device 102 may configure the camera parameters of the camera coupled to the mobile device 102. In one implementation, the mobile device may configure the camera parameters to capture images that are optimal for the environment, in other implementations, the mobile device 102 may configure or set the camera parameters so that the mobile device 102 captures multiple images with different parameters to increase the probability of capturing images that are more suitable for location detection. In yet other implementations, the process of setting the camera parameters may be a combination of capturing multiple images with various camera parameters, wherein the camera parameters have been selected based on the current environment, such as lighting, background, etc.

The mobile device 102 may configure or set several camera parameters for the camera, such as zoom, exposure, aperture, shutter speed, white balance, focus and flash for capturing visual data that is more suitable for location detection. The settings used by the user in taking pictures may not be optimal for location detection. For example, images from the users may have artifacts of illumination, motion blur, etc., resulting in poor quality images that are not useful for determining the location of the mobile device.

In one instance, a user of the camera taking pictures of friends in a shopping mall may focus the lens on the friends and not the storefront logo in the background that may be desirable for location detection. The mobile device 102 may set the zoom and focus such that the mobile device 102 also captures images with visual features such as the storefront logo in the background that may help with the location detection.

Similarly, in another example, the mobile device user may configure the camera to take the lighting effects in a shopping mall during Christmas time at night, by turning off the flash. In such a scenario, there may not be enough lighting for detection of the storefront logo in the background and the mobile device 102 may take a subsequent image with the flash on, according to embodiments of the disclosure, to capture an image that would be better suited for location detection using visual features, such as a storefront logo, from the image.

Furthermore, the process of collecting data from user images is an opportunistic and slow process. Embodiments of the disclosure expedite and enhance the process of building out and updating a heatmap. For example, the mobile device 102 upon determining that the current location is a location of interest for acquiring wireless information may activate a burst mode for taking multiple shots subsequently in a short period of time with same or different camera parameters to enhance the probability of capturing an image with visual features that will be useful for location determination.

In some implementations, even though the mobile device may capture multiple images at or close to the same location, the mobile device may select one image from the plurality of images to process, tag with wireless information and send to a crowdsourcing server 116. In another implementation, the mobile device may consolidate several images into a single image and send it to the crowdsourcing server 116. In yet another implementation, the mobile device may tag and send all the images individually or collectively to a crowdsourcing server 116 for further processing.

As shown in FIG. 4, approximately at the time of acquiring the one or more images, the mobile device 102 receives signals from four different signal emitting devices 108*a-d*. The location of the signal emitting device 108 with respect to the mobile device 102 may be unknown at the time of acquiring the image or receiving the signals from the signal emitting devices. The mobile device 102 determines source identifying information (e.g., MAC address) for each of the four signal emitting devices. Furthermore, in some implementations, the mobile device may also determine the RSSI and/or the RTT for the signal between the signal emitting device 108 and mobile device 102. The combination of the source identifying information and other characteristics of the signal, such as RSSI and/or RTT, may represent a relationship between the current location of the mobile device 102 and the signal emitting device. Several such relationships (e.g., MAC address, RSSI/RTT), similar to what has been described in FIG. 3, may form a sufficiently unique signature for the location of the mobile device 102.

Figure 5:
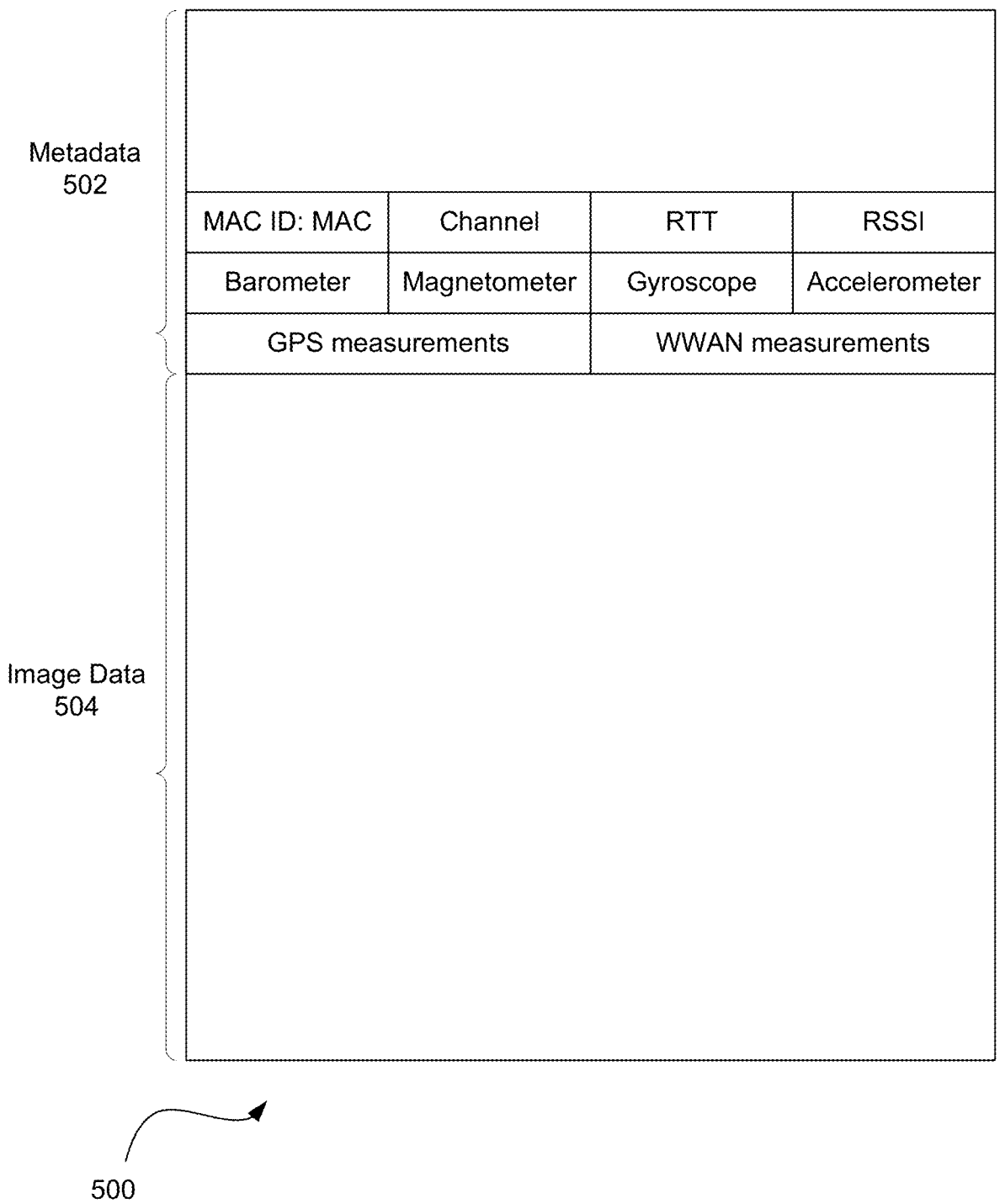
FIG. 5 illustrates an example data structure for an image file according to an example aspects.

In one embodiment, the mobile device 102 may tag the information associated with the one or more signal emitting devices 108 acquired at the time the image or video was taken by a camera coupled to the mobile device 102 to the captured one or more images. Tagging of the one or more image with information associated with the one or more signal emitting devices at the time the image is captured forms a strong temporal and spatial association between the visual information embodied in the image and the signals received by the mobile device 102 at the instance the image is captured. FIG. 5 below describes one example embodiment of tagging an image with information associated with the wireless signals.

In addition to tagging an image with information associated with wireless signal emitting devices 108, the mobile device 102 may also tag the image with sensor data, such as information from one or more barometer sensors, magnetometer sensors or motion sensors. Tagging the image with information from barometer sensors may help indicate the elevation at which the image was captured. Similarly, tagging the image with information from the magnetometer may help determine the heading of the mobile device 102 at the time the image was captured. Furthermore, the mobile device 102 may include motion sensors, such as inertial sensors that may include gyroscopes and accelerometers. Tagging the image with motion sensor information may also help determine the pose of the device and any relative and absolute motion experienced by the mobile device 102 at the time the image is acquired.

In some instances, tagging the image with sensor information may comprise tagging the image with a delta or change associated with the readings of the sensor data. For example, in some instances it may be useful to include the change in the barometric pressure rather than the absolute barometric pressure to determine that the user has moved from one level of the shopping mall to another level of the shopping mall. Similarly, for a gyroscope, the change in the gyroscope sensor reading may be more helpful in determining the relative rotation from a previously determined pose, rather than the absolute value of the gyroscope reading at the time the image was captured.

In some embodiments, the mobile device 102 may also tag the image with camera parameters used in acquiring the visual data. The crowdsourcing server 116 may use the camera parameters in the location determination process. For example, knowing the zoom used in acquiring the image may help the crowdsourcing server 116 in determining the distance between a visual feature, such as a storefront logo and the camera capturing the image.

FIG. 5 illustrates an example data structure for an image/video file that depicts tagging visual data acquired using a camera with information associated with signal emitting devices and/or sensors. Information associated with the signal emitting devices may include source identifying information for the signal emitting devices and wireless and/or sensor measurement information. Tagging the visual data with information associated with the signal emitting devices may refer to including the additional information in the metadata for the image/video file. Generally, metadata describes the attributes associated with the image/video. For example, the metadata for an Exchangeable image file format (Exif) may include the format of the file, the device used to capture the image, date and time, resolution of the image, exposure, focal length, flash, etc.

Embodiments also describe expanding the current format dictated by the standards for image (e.g., Exif) and video formats (mediaObject metadata) to include information associated with wireless signal emitting devices and sensor data in the metadata. Examples of wireless information may include, but is not limited to wireless wide area network (WWAN) measurements and Wi-Fi measurements. Wi-Fi measurements may include RSSI and RTT measurements. Sensor information may include barometer, magnetometer and motion sensor (e.g., accelerometer, gyroscope, etc.) information. The mobile device 102 may generate a file according to the new expanded standard for Exif images and store it in memory Immediately, or at a later point in time, the mobile device 102 may transmit the file with the tagged visual data to the crowdsourcing server 116.

FIG. 5 illustrates an example image file 500 showing the image data 504 and the associated metadata 502 with the image data. In FIG. 5, the metadata 502 depicts additional information associated with signal emitting devices and sensors coupled to the mobile device 102, according to certain embodiments of the disclosure.

In one embodiment, the signal emitting devices may be one or more APs (although, fields for only one AP are shown). The source identifying information associated with the AP may be the MAC address. The information associated with the signal received from the signal emitting device, such as the AP, may be the RTT and/or the RSSI measurements. In some embodiments, the type of measurement may be selected based on the capabilities of the AP. For instance, some APs may not support RTT capability and RSSI measurements may be used instead. In some instances, both RTT and RSSI measurements may be used to provide additional information in defining the signal characteristics at the location of the mobile device 102. In some implementations, the channel or the frequency in use by the AP may also be included in the metadata 502 for the image file 500.

In one example, where the user is taking a picture using a camera coupled to the mobile device 102, the image data may be stored as an image file using an expanded Exif standard, as described herein. In one example, an Extensible Metadata Platform (XMP) that is part of the international organization of standards (ISO) may be used in defining and populating the fields for the metadata, such as MAC ID (e.g, 1caa07c6e370), RSSI (e.g., −70 dbm) and/or RTT (e.g., 0.0154 msecond). In another example (not shown), similar fields may be used for tagging a video file (e.g., mediaObject metadata).

Figure 6:
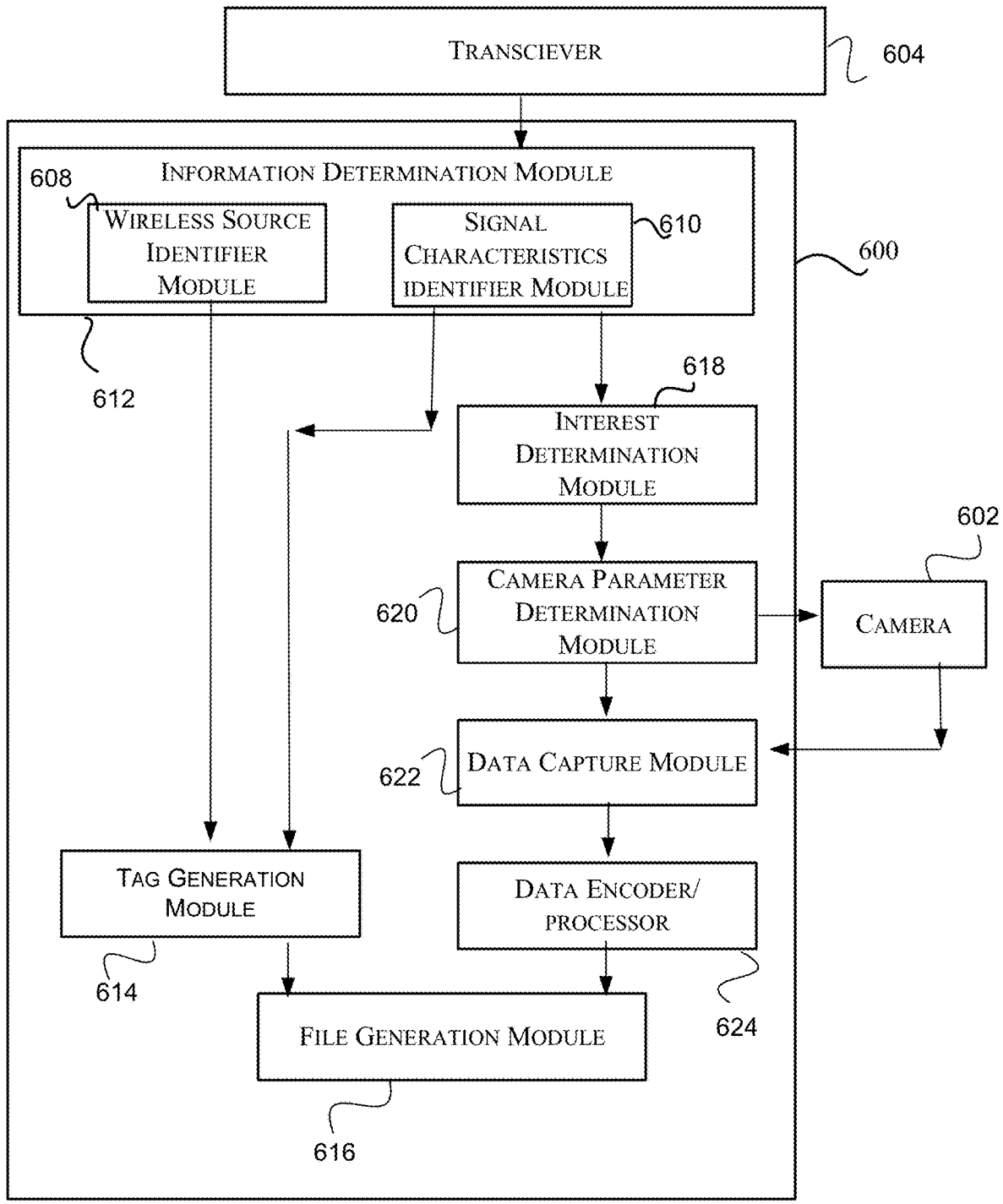
FIG. 6 illustrates a block diagram for example modules implemented in a mobile device according to certain example aspects of the disclosure.

FIG. 6 illustrates a block diagram for example modules implemented in a mobile device 102 according to one embodiment of the disclosure. The mobile device 102 may be a computer device implemented using one or more components described in FIG. 9. Modules described in FIG. 6 may be implemented using software, firmware, hardware or any other combination thereof. In one embodiment, some of the modules described in FIG. 6 may be stored as software modules on a computer-readable medium 600 that may be any magnetic, electronic, optical, or other computer-readable storage medium. In one implementation, the computer-readable storage medium may include an information determination module 612, interest determination module 618, camera parameter determination module 620, data capture module 622, data encoder/processor module 624, wireless source identifier module 608, signal characteristics identifier module 610, tag generation module 614, and file generation module 616.

The wireless transceiver 604 coupled to the mobile device 102 may receive one or more wireless signals from one or more signal emitting devices. Although only one transceiver 604 is illustrated in FIG. 6, it is understood that a mobile device may include one or more wireless transceivers that may be capable of transmitting as well as receiving wireless signals. In some instantiations, the transceiver 604 may include components configurable to emit and receive signals, such as Wi-Fi signal, audible and non-audible (e.g., ultra-sound) sound, and visible and non-visible (e.g., infra-red) light rays.

Wireless signal emitting devices, as discussed in FIG. 1, may represent different types of devices, such as access points, radio beacons, cellular base stations, femtocells, or the like, depending on an implementation. For example, in some embodiments, a wireless signal emitting device 108 may include devices such as light (visible and non-visible) emitting devices and sound (audible and non-audible) emitting devices.

The information determination module 612 may receive information from the transceiver 604 and derive information regarding the signal and the wireless signal emitting device 108 for the signal. The information determination module 612 may comprise several modules for deriving information from the signal, such as the wireless source identifier module 608 and the signal characteristics identifier module 610. The wireless source identifier module 608 may receive information from the transceiver 604 and derive source identifying information associated with the signal emitting device from the wireless signal. For example, the wireless source identifier module 608 may decode the header for a data packet received from a signal emitting device, such as a wireless AP and derive the MAC address. The MAC address provides a sufficiently unique identifier for the AP.

The signal characteristics identifier module 610 may derive characteristics associated with the signal from the signal emitting device that may indicate the relative positioning of the mobile device 102 with respect to the signal emitting device 108. For example, the signal characteristics identifier module 610 may derive the signal strength (i.e., RSSI) of the at least one wireless signal received from the at least one signal emitting device 108 measured at the device. In another example, the signal characteristics identifier module 610 may derive the round trip time (i.e., RTT) using the at least one wireless signal from the at least one signal emitting device 108.

The information determination module 612 may additionally derive other information regarding one or more signals and the wireless signal emitting devices for the signals that may enable the mobile device in determining the interest in capturing visual data more suitable for location detection. Such information may include capabilities of the signal emitting device (e.g., support for RTT), the number of signal emitting devices in the vicinity, a policy for a geo fenced region associated with location of the mobile device, determining the vendor and other characteristics of the signal emitting device and/or determining if the signal emitting device is known to a remote server generating or maintaining a heatmap using information associated with the signal emitting device.

The interest determination module 618 receives information from the information determination module 612 and determines the interest by the mobile device 102 in capturing visual data, such as images, that are more suitable for location detection. An interest for acquiring images that are more suitable for location detection at a location may be based on the capabilities of the signal emitting device (e.g, support for RTT) in the vicinity, the number of signal emitting devices in the vicinity, a policy for a geo fenced region associated with location of the mobile device, determining the characteristics of the signal (e.g., signal strength or RSSI), determining the vendor of the signal emitting device and/or determining if the signal emitting device is known to a remote server generating or maintaining a heatmap using information associated with the signal emitting device.

In some implementations, the interest determination module 618 may communicate with a remote server, such as the crowdsourcing server 116 in determining an interest in the wireless signals at a location. In one implementation, the determination of the interest associated with the location may be by a remote server, such as the crowdsourcing server 116 or a combination of information sharing and decision making by both the interest determination module 618 on the mobile device 102 and the remote server. Furthermore, in some instances, the mobile device 102 may autonomously determine the interest associated with a location, whereas in other instances, the mobile device may communicate with the remote server for either determining the interest or providing additional information for determining the interest for a location. In yet other embodiments, the mobile device 102 may be provided guidelines, rules or protocols for determining interest associated with a location, that may be pre-configured and/or periodically updatable by a remote server.

The camera parameter determination module 620 receives the interest or the level of interest from the interest determination module 618. For example, the interest may be expressed, simply in a binary decision of yes or no, or may be a scale with varying levels of interest. Based on the interest from the interest determination module 618, the camera parameter determination module 620 may configure the camera parameters of the camera 602 coupled to the mobile device. In one implementation, the camera parameter determination module 620 may configure the camera parameters to capture images that are optimal for the environment, in other implementations, the camera parameter determination module 620 may configure or set the camera parameters so that the mobile device 102 captures multiple images with different parameters to increase the probability of capturing images that are more suitable for location detection. In yet other implementations, the process of setting the camera parameters may be a combination of capturing multiple images with various camera parameters, wherein the camera parameters may be selected based on the current environment, such as lighting, background, etc.

The camera parameter determination module 620 may configure or set several camera parameters for the camera 602, such as zoom, exposure, aperture, shutter speed, white balance, focus and flash for capturing visual data, such as images, that are more suitable for location detection. It is understood that while only one camera 602 is illustrated in FIG. 6, the mobile device 102 may include one or more cameras that may all, or individually, have camera parameters that are set or adjusted by the camera parameter determination module 620.

The camera 602 may be programmed with the camera parameters for capturing visual data that is more suitable for location determination. In one embodiment, capturing an image may refer to acquiring the data using the camera lens and apparatus. The user may acquire visual data (i.e., take pictures or capture a video) using one or more cameras 602 coupled to the mobile device 102. The configuration or adjustments to the camera 602 may result in one or multiple subsequent shots of the scene with same or different camera parameters programmed by the camera parameter determination module 620.

The data capture module 622 may capture the raw visual data and store it temporarily in a buffer for further processing by the data encoder/processor 624. The data encoder/processor module 624 may encode the visual data into a standard format, such as Tagged Image File Format (TIFF) or Joint Photographic Experts Group (JPEG) for images or Movie Pictures Expert Group-4 (MPEG4) for video or any other suitable format. In one implementation, the data encoder/processor module 624 may compress several images or clips into a single file or select one out of several images for further processing and transmission based on the suitability of the image for location determination.

The tag generation module 614 may generate a tag using the source identifying information from the wireless source identifier module 608 for each of the signal emitting devices and the associated RSSI, RTT or any other signal characteristic identifier from the signal characteristics identifier module 610. Generating the tag may comprise formatting the information regarding the signal emitting devices 108 such that it can be included in the metadata for a file.

In one embodiment, the tag generation module 614 may optionally receive information from one or more sensors and use it in generating the tag. Sensor information may include barometer, magnetometer and motion sensor (e.g., accelerometer, gyroscope, etc.) information. In some implementations, the sensor information incorporated in the tag may also include GNSS coordinates, if available, or last known GNSS derived location that may help derive a coarse estimation of the location for further processing.

The file generation module 616 may receive input from the data encoder/processor 624 and the tag generation module 614 and generate the file. In one embodiment, for image data, the file may be generated according to the Exif standard by including the encoded data from the data encoder/processor 624 (e.g., JPEG or TIFF) and the tag from the tag generation module 614.

After generating the file, in one embodiment, the mobile device 102 may also transmit the file to a remote server, such as a crowdsourcing server 116.

Figure 7:
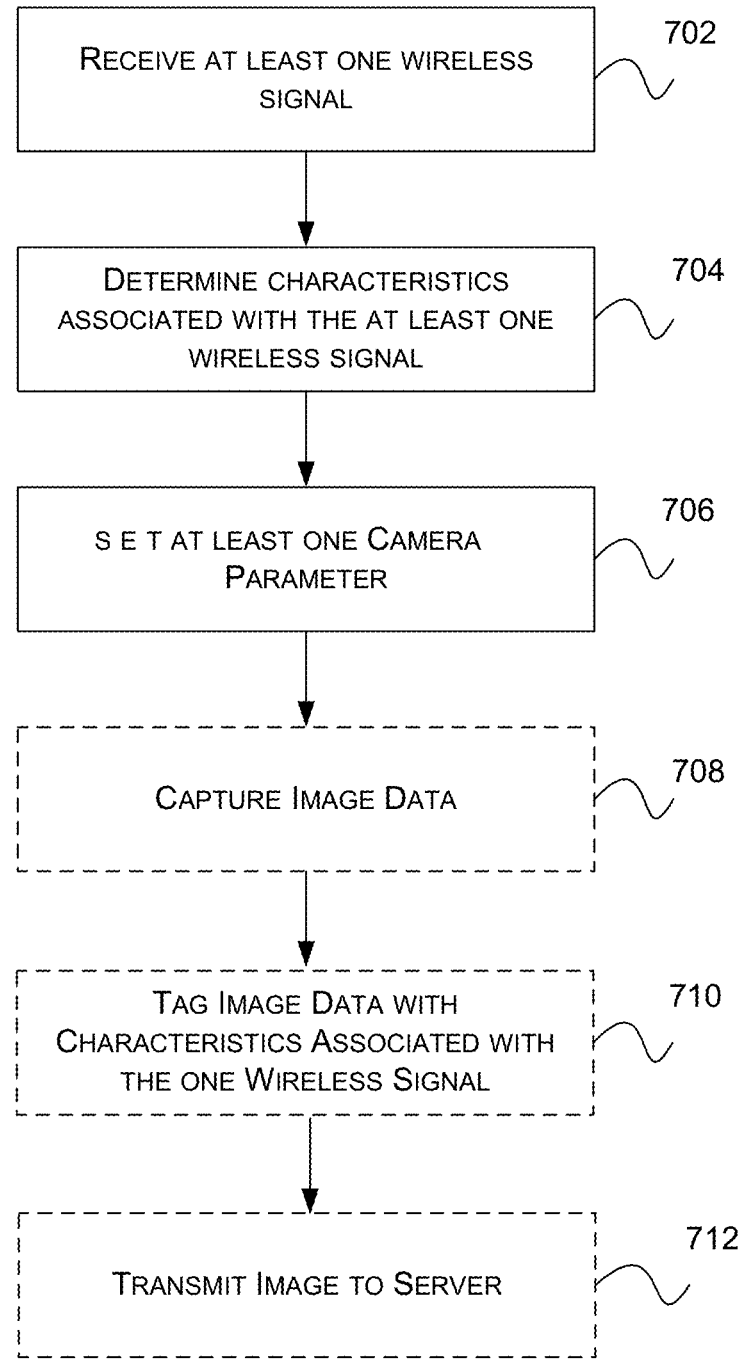
FIG. 7 is a flow diagram illustrating a method for performing one or more illustrative aspects of the disclosure.

FIG. 7 is a flow diagram illustrating a method for performing embodiments of the disclosure according to one or more illustrative aspects of the disclosure. According to one or more aspects, any and/or all of the methods and/or method blocks described herein may be implemented by and/or in a mobile device 102, such as the mobile device 102 shown in FIG. 1 and/or the device described in greater detail in FIG. 9, for instance. In one embodiment, one or more of the method blocks described below with respect to FIG. 7 are implemented by a processor of the mobile device 900, such as the processor(s) 910 or another processor. Additionally, or alternatively, any and/or all of the methods and/or method blocks described herein may be implemented in computer-readable instructions, such as computer-readable instructions stored on a computer-readable medium such as the memory 935, storage device(s) 925 or another computer-readable medium.

At block 702, components of the mobile device 102, such as the transceiver 604 (see FIG. 6), may receive at least one signal associated with at least one signal emitting device. The at least one signal emitting device may be a wireless access point (AP). In some embodiments, signal emitting devices 108 (see FIG. 1), may also include devices configurable to emit signals such as Wi-Fi signal, audible and non-audible sound, and (visible and non-visible) light rays. In one embodiment, the at least one signal may be acquired in a GNSS-denied environment. For example, the user may be taking pictures in an indoor location, such as a shopping mall without direct line of sight to a sufficient number of GNSS satellites.

At block 704, components of the mobile device 102, such as the signal characteristics identifier module 610 (see FIG. 6), may determine characteristics associated with the at least one signal of the at least one signal emitting device using the at least one signal. The characteristics associated with the at least one signal of the at least one signal emitting device may include the signal strength (e.g., RSSI) associated with the at least one signal from the signal emitting device.

At block 706, components of the mobile device 102, such as the camera parameter determination module 620 (see FIG. 6), may set at least one camera parameter for a camera 602 (see FIG. 6) coupled to the mobile device 102 for capturing image data based on the characteristics associated with the at least one signal of the at least one signal emitting device 108. In one embodiment, setting the at least one camera parameter may include switching to a mode wherein the camera 602 captures a plurality of images in response to a request for acquiring image data independently of a user of mobile device. Setting the at least one camera parameter may also include one or more of zoom, exposure, aperture, shutter speed, white balance, focus and flash. In another embodiment, setting the at least one camera parameter may further include changing the at least one camera parameter for each of the images of the plurality of images.

At block 708, components of the mobile device 102, such as the camera 602 and/or the data capture module 622 (see FIG. 6), may capture the image data using the at least one camera parameter.

At block 710, components of the mobile device 102, such as the file generation module 616 (see FIG. 6), may in the process of generating a file tag the image data with the characteristics of the at least one signal associated with the at least one signal emitting device.

At block 712, components of the mobile device, 102, such as the transceiver 604 may transmit the tagged image data to a remote server.

It should be appreciated that the specific blocks illustrated in FIG. 7 provide a particular method of switching between modes of operation, according to an embodiment of the present disclosure. Other sequences of blocks may also be performed accordingly in alternative embodiments. For example, alternative embodiments of the present disclosure may perform the blocks outlined above in a different order. Furthermore, additional blocks or variations to the blocks may be added or removed depending on the particular applications. One of ordinary skill in the art would recognize and appreciate many variations, modifications, and alternatives of the process.

Figure 8:
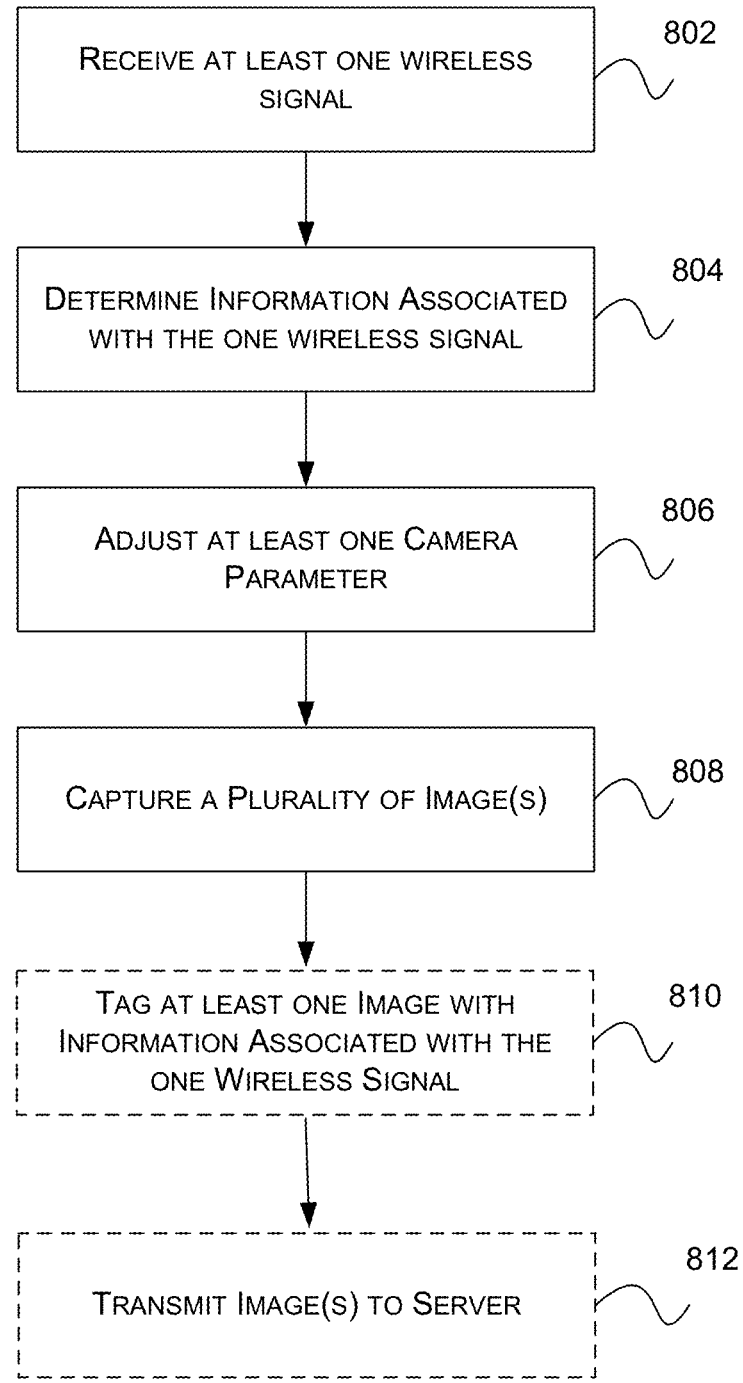
FIG. 8 is another flow diagram illustrating a method for performing one or more illustrative aspects of the disclosure.

FIG. 8 is a flow diagram illustrating a method for performing embodiments of the disclosure according to one or more illustrative aspects of the disclosure. According to one or more aspects, any and/or all of the methods and/or method blocks described herein may be implemented by and/or in a mobile device 102, such as the mobile device 102 (see FIG. 1) and/or the device described in greater detail in FIG. 9, for instance. In one embodiment, one or more of the method blocks described below with respect to FIG. 8 are implemented by a processor of the computing device 900, such as the processor(s) 910 or another processor. Additionally, or alternatively, any and/or all of the methods and/or method blocks described herein may be implemented in computer-readable instructions, such as computer-readable instructions stored on a computer-readable medium such as the memory 935, storage 925 or another computer-readable medium.

At block 802, components of the mobile device 102, such as the transceiver 604 (see FIG. 6), may receive at least one signal associated with at least one signal emitting device. The at least one signal emitting device may be a wireless access point (AP). In some embodiments, signal emitting devices 108 (see FIG. 1), may also include devices configurable to emit signals such as Wi-Fi signal, audible and non-audible sound, and (visible and non-visible) light rays. In one embodiment, the at least one signal may be acquired in a GNSS-denied environment. For example, the user may be taking pictures in an indoor location, such as a shopping mall without direct line of sight to a sufficient number of GNSS satellites.

At block 804, components of the mobile device 102, such as the information determination module 612 (see FIG. 6), may determine information associated with the at least one signal emitting device 108 using the at least one signal. The information associated with the at least one signal of the at least one signal emitting device 108 may include the signal strength (e.g., RSSI), round trip time (RTT), source identifying information associated with the signal emitting device (e.g., MAC address, IP address), capabilities of the signal emitting device (e.g, support for RTT), the number of signal emitting devices 108 in the vicinity, a policy for a geo fenced region associated with the general location of the mobile device 102, determining the vendor of the signal emitting device 108 and/or determining if the signal emitting device 108 is known to a remote server generating or maintaining a heatmap using information associated with the signal emitting device 108.

At least in some embodiments, the information derived from the signal or through the signal from the signal emitting device 108, in itself may not provide the exact location of the mobile device. However, the information derived may only provide data that may be used to determine the interest in the location for acquiring images suitable for location detection and correlate the characteristics of that specific location with the actual location using a heatmap at a later point in time.

At block 806, components of the mobile device 102, may set at least one camera parameter for a camera 602 (see FIG. 6) coupled to the mobile device 102, based on the information associated with the at least one signal emitting device 108. Such information can be useful to help determine whether an image of the area is desirable, and if desirable, what an appropriate camera parameter could be. Using known map data that includes labels for various stores within a mall, for example, in coordination with images taken from inside the mall that might include storefront names, etc., can help identify ground truth for the location from which the image was taken. If a mobile device taking such an image transmits this image to a server along with signal measurement information, such as a list of APs with RSSI, RTT measurements, etc., associated with the location at which the image was taken, an image-based location estimate can then be correlated to the signal measurement information. When a large number of such images along with signal measurement information is analysed by crowdsourcing, the accuracy in determining the location of the APs themselves can be improved over reported AP location or over calculations of AP location based on only one or a small number of signal measurements. For example, if the information associated with the at least one signal emitting device 108, which can include a general or rough location, includes a policy for a geo fenced region associated with the general location, such a policy may indicate that a large number of crowdsourced images would be helpful in a particular general location, but each mobile device need only take a single image. In such a case, a camera parameter could include a mode in which a camera associated with the mobile device 102 takes a single image. In another scenario, if the information associated with the at least one signal emitting device 108 indicates that a large number of APs are available in that general area, or that there are many RTT-capable APs in the area, meaning that good signal measurements are available in that area for position location, then it can be concluded that more images would be desirable in that area.

At block 808, components of the mobile device 102, may capture a plurality of images using the at least one camera parameter. Setting the at least one camera parameter may also include zoom, exposure, aperture, shutter speed, white balance, focus, or flash, or any combination thereof. In another embodiment, setting the at least one camera parameter may further include changing the at least one camera parameter for each of the images of the plurality of images. Servers that analyze images for position location often use one or more computer vision algorithms to analyze features in the images to help in an image-based location estimate for the location at which the image was taken. Such computer vision algorithms might include edge detection, optical character-recognition, face detection, object detection, or other computer vision methods. Such computer vision methods can often benefit from a plurality of images of the same scene at different zoom, exposure, aperture, etc. Therefore, if, for example, at a given general location based on information associated with the at least one signal emitting device 108, it is determined that a plurality of images of varying zoom or white balance, etc., could be useful, a plurality of images can be captured where the camera parameter setting for at least one of the images is different from the camera parameter setting for at least one other image.

At block 810, components of the mobile device 102, may tag an image from the plurality of images with the information associated with the at least one signal emitting device 108. In one embodiment, multiple images may be processed by the processor and compressed into a single image to form a visual image such that the visual features are more readily detectable from the visual data. In another embodiment, one image that may be more suitable for location detection may be selected from the plurality of images. In yet another embodiment, all the images may be processed and tagged with the information associated with the at least one signal emitting device 108.

At block 812, components of the mobile device 102, may further transmit the tagged images to a remote server. In one embodiment, the remote server is a crowdsourcing server 116 (see FIG. 1).

It should be appreciated that the specific blocks illustrated in FIG. 8 provide a particular method of switching between modes of operation, according to an embodiment of the present disclosure. Other sequences of blocks may also be performed accordingly in alternative embodiments. For example, alternative embodiments of the present disclosure may perform the blocks outlined above in a different order. Furthermore, additional blocks or variations to the blocks may be added or removed depending on the particular applications. One of ordinary skill in the art would recognize and appreciate many variations, modifications, and alternatives of the process.

Figure 9:
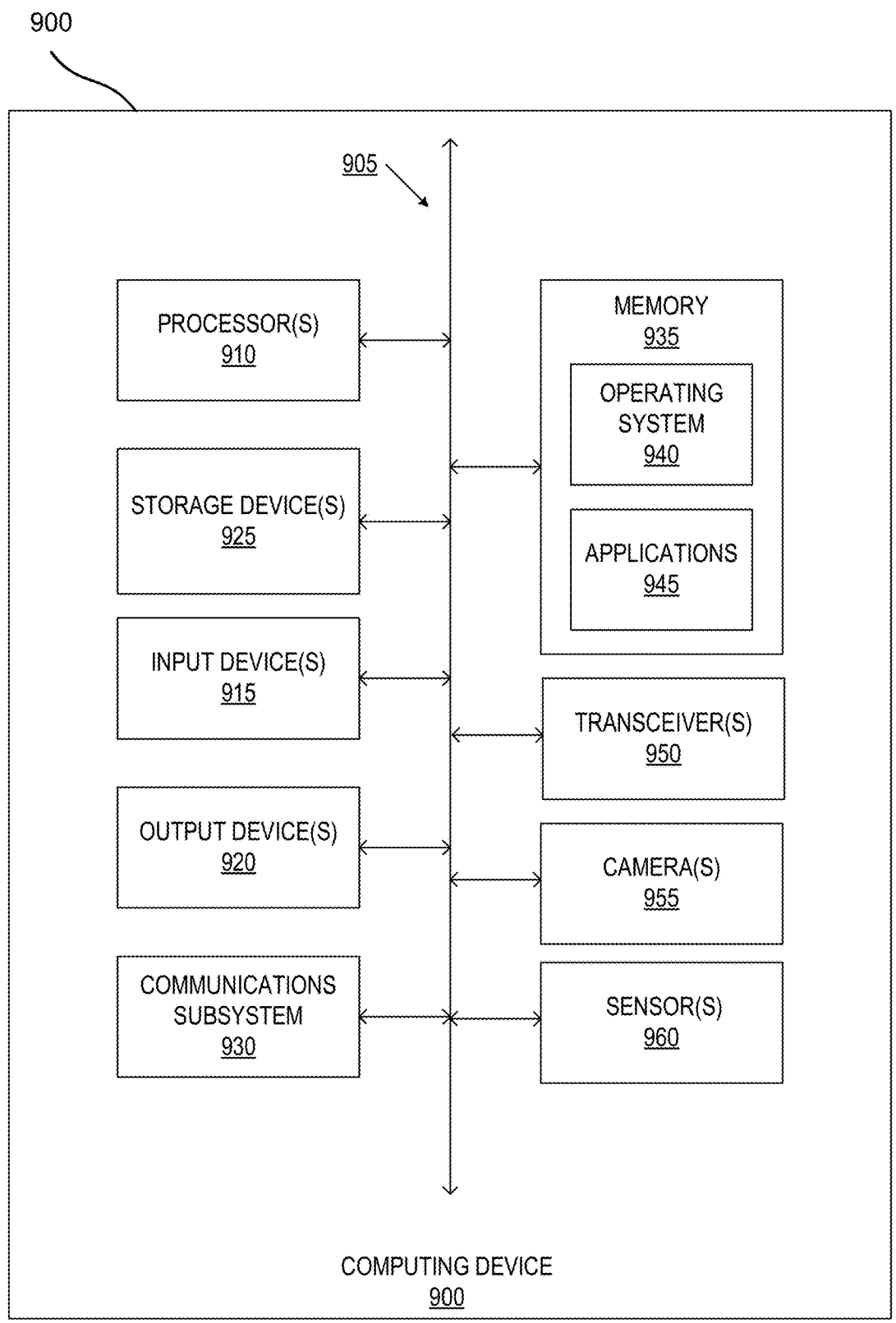
FIG. 9 illustrates an example of a computing system in which one or more aspects may be implemented.

FIG. 9 illustrates an example computing device incorporating parts of the device employed in practicing embodiments of the disclosure. A computing device as illustrated in FIG. 9 may be incorporated as part of any computerized system, herein. For example, computing device 900 may represent some of the components of a mobile device or a server (e.g., crowdsourcing server). Examples of a computing device 900 include, but are not limited to, desktops, workstations, personal computers, supercomputers, video game consoles, tablets, smart phones, laptops, netbooks, or other portable devices. FIG. 9 provides a schematic illustration of one embodiment of a computing device 900 that may perform the methods provided by various other embodiments, as described herein, and/or may function as the host computing device, a remote kiosk/terminal, a point-of-sale device, a mobile multifunction device, a set-top box and/or a computing device. FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computing device 900 is shown comprising hardware elements that may be electrically coupled via a bus 905 (or may otherwise be in communication, as appropriate). The hardware elements may include one or more processors 910, including, without limitation, one or more general-purpose processors and/or one or more special-purpose processors (such as digital signal processing chips, graphics acceleration processors, and/or the like); one or more input devices 915, which may include, without limitation, one or more cameras 955, sensors 960, a mouse, a keyboard and/or the like; and one or more output devices 920, which may include, without limitation, a display unit, a printer and/or the like. Sensors 960 may include barometer, magnetometer and/or motion sensors, such as gyroscopes and accelerometers.

The computing device 900 may further include (and/or be in communication with) one or more non-transitory storage devices 925, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including, without limitation, various file systems, database structures, and/or the like.

The computing device 900 might also include a communications subsystem 930. The communications subsystem 930 may include a transceiver 950 for receiving and transmitting data or a wired and/or wireless medium. The communications subsystem 930 may also include, without limitation, a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computing devices, and/or any other devices described herein. In many embodiments, the computing device 900 will further comprise a non-transitory working memory 935, which may include a RAM or ROM device, as described above.

The computing device 900 may comprise software elements, shown as being currently located within the working memory 935, including an operating system 940, device drivers, executable libraries, and/or other code, such as one or more application program(s) 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computing device, such as computing device 900. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 900 and/or might take the form of source and/or installable code, which, upon compilation and/or installation on the computing device 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to additional computing devices similar to computing devices 900, such as network input/output devices may be employed.

Some embodiments may employ a computing device (such as the computing device 900) to perform methods in accordance with the disclosure. For example, some or all of the procedures of the described methods may be performed by the computing device 900 in response to processor(s) 910 executing one or more sequences of one or more instructions (which might be incorporated into the operating system 940 and/or other code, such as application program(s) 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "non-transitory computer-readable medium," "machine-readable medium" and "computer-readable medium," as used herein, refer to any medium that participates in providing data that causes a machine to operate in a specific fashion. In an embodiment implemented using the computing device 900, various computer-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 925. Volatile media include, without limitation, dynamic memory, such as the working memory 935. Transmission media include, without limitation, coaxial cables, copper wire and fiber optics, including the wires that comprise the bus 905, as well as the various components of the communications subsystem 930 (and/or the media by which the communications subsystem 930 provides communication with other devices). Hence, transmission media may also take the form of waves (including, without limitation, radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 900. These signals, which might be in the form of electromagnetic signals, acoustic signals, optical signals and/or the like, are all examples of carrier waves on which instructions may be encoded, in accordance with various embodiments of the disclosure.

The communications subsystem 930 (and/or components thereof) generally will receive the signals, and the bus 905 then might carry the signals (and/or the data, instructions, etc., carried by the signals) to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the disclosure. Rather, the preceding description of the embodiments will provide those skilled in the art with an enabling description for implementing embodiments of the disclosure. Various changes may be made in the function and arrangement of elements without departing from the spirit and scope of the disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional blocks not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments of the disclosure. Also, a number of blocks may be undertaken before, during, or after the above elements are considered. Accordingly, the above description does not limit the scope of the disclosure.

What is claimed is:

1. A method for capturing image data, the method comprising:
   receiving, at a mobile device, from a server, one or more rules for capturing images for a location;
   receiving, at the mobile device, at least one signal transmitted by at least one wireless access point within signal range of the location;
   setting at least one camera parameter of a camera coupled to the mobile device, wherein the camera parameter determined based on information derived from the at least one signal transmitted by the at least one wireless access point; and
   capturing, responsive to the receiving of the at least one signal transmitted by the at least one wireless access point and responsive to satisfying a rule from the one or more rules for the location, the image data with the camera using the at least one camera parameter, wherein the satisfied rule is separate from the information derived from the at least one signal.

2. The method of claim 1, further comprising tagging the image data with the information derived from the at least one signal transmitted by the at least one wireless access point.

3. The method of claim 1, further comprising transmitting the image data to a remote server.

4. The method of claim 1, wherein setting the at least one camera parameter comprises switching to a mode wherein the camera captures a plurality of images in response to a request for acquiring the image data.

5. The method of claim 4, further comprising changing the at least one camera parameter for each of the images of the plurality of images.

6. The method of claim 1, wherein the information derived from the at least one signal transmitted by the at least one wireless access point comprises a signal measurement of the at least one signal transmitted by the at least one wireless access point.

7. The method of claim 6, wherein the signal measurement is a signal strength measurement for the at least one signal transmitted by the at least one wireless access point.

8. The method of claim 6, wherein the information derived from the at least one signal of the at least one wireless access point comprises a unique fingerprint for a location of the mobile device, the unique fingerprint being generated using a hash function of data including at least the signal measurement.

9. The method of claim 1, wherein the information derived from the at least one signal transmitted by the at least one wireless access point comprises information associated with the at least one wireless access point including one or more of source identifying information of the at least one wireless access point, positioning capabilities of the at least one wireless access point, or a number of the at least one wireless access point, or any combination thereof.

10. The method of claim 9, wherein the positioning capabilities of the wireless access point comprises round trip time (RTT) support capability.

11. The method of claim 9, wherein the source identifying information of the at least one wireless access point comprises a MAC address of the at least one wireless access point.

12. The method of claim 1, wherein the at least one camera parameter includes zoom, exposure, aperture, shutter speed, white balance, focus, or flash, or any combination thereof.

13. The method of claim 1, further comprising tagging the image data with one or more of barometer data, magnetometer data, or motion sensor data, or any combination thereof.

14. A mobile device for capturing image data comprising:
a transceiver configured to:
receive, one or more rules for capturing images for a location from a server; and
receive at least one signal transmitted by at least one wireless access point within signal range of the location;
a camera configured to capture image data, responsive to receiving of the at least one signal transmitted by the at least one wireless access point and responsive to satisfying a rule from the one or more rules for the location; and
prior to capturing image data, a processor configured to:
determine at least one camera parameter for capturing image data based on information, separate from the satisfied rule, derived from the at least one signal transmitted by the at least one wireless access point; and
set the at least one camera parameter such that the camera is configured to use the at least one camera parameter when capturing the image data.

15. The mobile device of claim 14, wherein the processor is further configured to tag the image data with the information derived from the at least one signal transmitted by the at least one wireless access point.

16. The mobile device of claim 14, wherein the processor is further configured to instruct the transceiver to transmit the image data to a remote server.

17. The mobile device of claim 14, wherein the processor configured to set the at least one camera parameter includes the processor configured to instruct the camera to capture a plurality of images using a different at least one camera parameter for each of the images of the plurality of images.

18. The mobile device of claim 14, wherein the information derived from the at least one signal transmitted by the at least one wireless access point comprises a signal measurement of the at least one signal transmitted by the at least one wireless access point.

19. The mobile device of claim 18, wherein the information derived from the at least one signal of the at least one wireless access point comprises a unique fingerprint for a location of the mobile device, the unique fingerprint being generated using a hash function of data including at least the signal measurement.

20. The mobile device of claim 14, wherein the information derived from the at least one signal transmitted by the at least one wireless access point comprises information associated with the at least one wireless access point including one or more of source identifying information of the at least one wireless access point, positioning capabilities of the at least one wireless access point, or a number of the at least one wireless access point, or any combination thereof.

21. The mobile device of claim 14, wherein the at least one camera parameter includes zoom, exposure, aperture, shutter speed, white balance, focus, or flash, or any combination thereof.

22. The mobile device of claim 14, wherein the processor is further configured to tag the image data with one or more of barometer data, magnetometer data, or motion sensor data, or any combination thereof.

23. A non-transitory computer-readable storage medium, wherein the non-transitory computer-readable storage medium comprises instructions executable by a processor for:
receiving from a server, one or more rules for capturing images for a location;
receiving at least one signal transmitted by at least one wireless access point within signal range of the location;
setting at least one camera parameter of a camera, wherein the camera parameter determined based on information derived from the at least one signal transmitted by the at least one wireless access point; and
capturing, responsive to the receiving of the at least one signal transmitted by the at least one wireless access point and responsive to satisfying a rule from the one or more rules for the location, image data with the camera using the at least one camera parameter, wherein the satisfied rule is separate from the information derived from the at least one signal.

24. The non-transitory computer-readable storage medium of claim 23, further comprising instructions executable by a processor for tagging the image data with the information derived from the at least one signal transmitted by the at least one wireless access point and transmitting the image data to a remote server.

25. The non-transitory computer-readable storage medium of claim 23, wherein the information derived from the at least one signal transmitted by the at least one wireless access point comprises a signal measurement of the at least one signal transmitted by the at least one wireless access point.

26. The non-transitory computer-readable storage medium of claim 23, wherein the information derived from the at least one signal transmitted by the at least one wireless access point comprises information associated with the at least one wireless access point including one or more of source identifying information of the at least one wireless access point, positioning capabilities of the at least one wireless access point, or a number of the at least one wireless access point, or any combination thereof.

27. An apparatus for capturing image data, comprising:
  means for receiving from a server, one or more rules for capturing images for a location;
  means for receiving at least one signal transmitted by at least one wireless access point within signal range of the location;
  means for setting at least one camera parameter of a camera, wherein the camera parameter determined based on information derived from the at least one signal transmitted by the at least one wireless access point; and
  means for capturing, responsive to the receiving of the at least one signal transmitted by the at least one wireless access point and responsive to satisfying a rule from the one or more rules for the location, the image data with the camera using the at least one camera parameter, wherein the satisfied rule is separate from the information derived from the at least one signal.

28. The apparatus of claim 27, further comprising means for tagging the image data with the information derived from the at least one signal transmitted by the at least one wireless access point and means for transmitting the image data to a remote server.

29. The apparatus of claim 27, wherein the information derived from the at least one signal transmitted by the at least one wireless access point comprises a signal measurement of the at least one signal transmitted by the at least one wireless access point.

30. The apparatus of claim 27, wherein the information derived from the at least one signal transmitted by the at least one wireless access point comprises information associated with the at least one wireless access point including one or more of source identifying information of the at least one wireless access point, positioning capabilities of the at least one wireless access point, or a number of the at least one wireless access point, or any combination thereof.

* * * * *